United States Patent
Jin et al.

(10) Patent No.: US 11,477,008 B2
(45) Date of Patent: Oct. 18, 2022

(54) SERVICE PROCESSING METHODS, APPARATUSES, DEVICES AND SYSTEMS

(71) Applicant: ALIPAY (HANGZHOU) INFORMATION TECHNOLOGY CO., LTD., Zhejiang (CN)

(72) Inventors: Ge Jin, Hangzhou (CN); Jiawei Liu, Hangzhou (CN); Chenkan Shen, Hangzhou (CN); Chifei Zhang, Hangzhou (CN); Fansheng Kong, Hangzhou (CN)

(73) Assignee: Alipay (Hangzhou) Information Technology Co., Ltd., Zhejiang (CN)

(*) Notice: Subject to any disclaimer, the term of this patent is extended or adjusted under 35 U.S.C. 154(b) by 0 days.

(21) Appl. No.: 17/357,903

(22) Filed: Jun. 24, 2021

(65) Prior Publication Data

US 2021/0328769 A1 Oct. 21, 2021

(30) Foreign Application Priority Data

Aug. 24, 2020 (CN) .......................... 202010857809.1

(51) Int. Cl.
*H04L 9/06* (2006.01)
*G06F 21/53* (2013.01)
*H04L 9/00* (2022.01)

(52) U.S. Cl.
CPC ............ *H04L 9/0618* (2013.01); *G06F 21/53* (2013.01); *H04L 9/0643* (2013.01); *H04L 9/50* (2022.05)

(58) Field of Classification Search
CPC . H04L 9/0643; H04L 9/0618; H04L 2209/38; G06F 21/53

(Continued)

(56) References Cited

U.S. PATENT DOCUMENTS 7,845,567 B2 * 12/2010 Chan .................... G06K 7/0004
235/492
10,084,600 B1 9/2018 Irwan et al.
(Continued)

FOREIGN PATENT DOCUMENTS

CN 106899571 6/2017
CN 109327314 A1 2/2019
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Amare F Tabor
(74) *Attorney, Agent, or Firm* — Fish & Richardson P.C.

(57) ABSTRACT

A message processing request is received from a channel partner device, where the message processing request includes a ciphertext message encrypted in a trusted execution environment (TEE) of a service provider device based on a service processing request that includes a plaintext message of the ciphertext message, and where the service processing request requests at least a portion of the plaintext message to be sent to a target user. A first smart contract deployed in a blockchain of the blockchain network is invoked using a TEE of a blockchain node of a blockchain network. The ciphertext message is decrypted based on the first smart contract to obtain the plaintext message. The plaintext message is sent to an operator device to forward the at least a portion of the plaintext message to the target user.

17 Claims, 17 Drawing Sheets

(58) Field of Classification Search
USPC .......................................................... 380/28
See application file for complete search history.

(56) References Cited

U.S. PATENT DOCUMENTS

| | | | | |
|---|---|---|---|---|
| 10,657,293 | B1* | 5/2020 | Wei | .......................... G09C 1/00 |
| 10,839,070 | B1* | 11/2020 | Wei | ........................ H04L 9/0894 |
| 10,841,082 | B2* | 11/2020 | Ben-Ari | .................. H04L 9/302 |
| 2017/0352033 | A1 | 12/2017 | Buckman et al. | |
| 2020/0084027 | A1 | 3/2020 | Duchon et al. | |
| 2020/0153626 | A1* | 5/2020 | Guan | .................... H04L 63/123 |
| 2020/0169388 | A1* | 5/2020 | Wei | ....................... H04L 9/0637 |
| 2020/0349296 | A1* | 11/2020 | Young | ...................... G09C 5/00 |

FOREIGN PATENT DOCUMENTS

| | | |
|---|---|---|
| CN | 109600725 | 4/2019 |
| CN | 109726588 | 5/2019 |
| CN | 109740319 | 5/2019 |
| CN | 110601955 | 12/2019 |
| CN | 111385751 | 7/2020 |
| WO | WO2018152519 | 8/2018 |
| WO | WO 2019174187 A1 | 9/2019 |

OTHER PUBLICATIONS

Liu, "Application of Blockchain Technology in Social Network," China's Master's Theses Full-text Database, May 2018, 63 pages (with English abstract).
Nakamoto, "Bitcoin: A Peer-to-Peer Electronic Cash System," www.bitcoin.org, 2005, 9 pages.
Extended European Search Report in European Application No. 21182455.2, dated Nov. 26, 2021, 11 pages.
Makarov, smschain.org [online], "White Paper Smschain: A Decentralized SMS Gateway," Oct. 23, 2017, retrieved on Nov. 15, 2021, retrieved from URL<https//smschain.org/wp_smschain.pdf?v=1.2. 7>, 33 pages.
Menegay et al., "Secure Communications Using Blockchain Technology," 2018 IEEE Military Communications Conference (MILCOM), Oct. 29, 2018, pp. 599-604.

* cited by examiner

SERVICE PROCESSING METHODS, APPARATUSES, DEVICES AND SYSTEMS

CROSS-REFERENCE TO RELATED APPLICATIONS

This application claims priority to Chinese Patent Application No. 202010857809.1, filed on Aug. 24, 2020, which is hereby incorporated by reference in its entirety.

TECHNICAL FIELD

The present specification relates to the technical field of data processing, and in particular, to service processing methods, apparatuses, devices and systems.

BACKGROUND

With continuous development of scientific and technological levels, short message services (SMS) have been applied in many services. For example, during identity authentication, a verification code is sent in the form of a short message to complete identity authentication. For another example, in marketing activities, marketing information, etc. is sent to a user in the form of a short message. Therefore, the authenticity and validity of content of a short message are of vital importance. For service providers of SMS, how to provide low-cost services on the basis of ensuring the authenticity and validity of the content of the short message is a problem urgently needing to be solved.

SUMMARY

One or more embodiments of the present specification provide a service processing method applied to a node device accessed to a blockchain. The method includes the following: a message processing request sent by a channel partner device is received. The message processing request includes at least one message ciphertext to be processed. The message ciphertext is sent by a service provider device to the channel partner device based on a service processing request sent by a request user after at least one message plaintext to be processed that is included in the service processing request is encrypted through a trusted execution environment (TEE) of the service provider device. The service processing request is used to request to transmit a message to be sent in the message plaintext to a corresponding target user. A first smart contract deployed in the blockchain is invoked in the TEE of the node device. The message ciphertext is decrypted based on the first smart contract to obtain the message plaintext. The message plaintext is sent to an operator device so that the operator device sends the message to be sent in the message plaintext to the target user.

One or more embodiments of the present specification provide a service processing method applied to a service provider device. The method includes the following: a service processing request sent by a request user is received. The service processing request includes at least one message plaintext to be processed. The service processing request is used to request to send a message to be sent in the message plaintext to a corresponding target user. The message plaintext is encrypted based on a predetermined mode in a TEE of the service provider device to obtain a message ciphertext. The message ciphertext is sent to a channel partner device so that the channel partner device sends, based on the message ciphertext, a message processing request to a node device accessed to a blockchain. The node device sends the message plaintext obtained by decrypting the message ciphertext to an operator device in the TEE of the node device. The operator device sends the message to be sent in the message plaintext to the target user.

One or more embodiments of the present specification provide a service processing apparatus applied to anode device accessed to a blockchain. The apparatus includes a receiving module configured to receive a message processing request sent by a channel partner. The message processing request includes at least one message ciphertext to be processed. The message ciphertext is sent by a service provider device to the channel partner device based on a service processing request sent by a request user after at least one message plaintext to be processed that is included in the service processing request is encrypted through a TEE of the service provider device. The service processing request is used to request to send a message to be sent in the message plaintext to a corresponding target user. The apparatus further includes a decryption module configured to invoke a first smart contract deployed in the blockchain in the TEE of the node device. The message ciphertext is decrypted based on the first smart contract to obtain the message plaintext. The apparatus further includes a sending module configured to send the message plaintext an operator device so that the operator device sends the message to be sent in the message plaintext to the target user.

One or more embodiments of the present specification provide a service processing apparatus applied to a service provider device. The apparatus includes a receiving module configured to receive a service processing request sent by a request user. The service processing request includes at least one message plaintext to be processed. The service processing request is used to request to send a message to be sent in the message plaintext to a corresponding target user. The apparatus further includes an encryption module configured to encrypt, based on a predetermined mode, the message plaintext in a TEE of the service provider device to obtain a message ciphertext. The apparatus further includes a sending module configured to send the message ciphertext to a channel partner device. The channel partner device sends, based on the message ciphertext, a message processing request to a node device accessed to a blockchain. The node device sends the message plaintext obtained by decrypting the message ciphertext to an operator device in the TEE of the node device. The operator device sends the message to be sent in the message plaintext to the target user.

One or more embodiments of the present specification provide a service processing system. The system includes a service provider device, a channel partner device, an operator device, and a blockchain system. The service provider device is configured to receive a service processing request sent by a request user; encrypt at least one message plaintext to be processed that is included in the service processing request through a TEE of the service provider device to obtain a message ciphertext; and sends the message ciphertext to the channel partner device. The service processing request is used to request to send a message to be sent in the message plaintext to a corresponding target user. The channel partner device is configured to receive the message ciphertext sent by the service provider device; and send the message ciphertext to a node device in a blockchain system. The node device in the blockchain system is configured to receive the message ciphertext sent by the channel partner device; invoke a first smart contract deployed in the blockchain in the TEE of the node device; decrypt the message ciphertext based on the first smart contract to obtain the message plaintext; and send the message plaintext to the channel partner device. The operator device is configured to receive the message plaintext sent by the node device; send the message to be sent in the message plaintext to the target user.

One or more embodiments of the present specification provide a service processing device. The device includes a processor. The device further includes a memory configured to store computer-executable instructions. The computer-executable instructions, when executed, enable the processor to receive a message processing request sent by a channel partner device. The message processing request includes at least one message ciphertext to be processed. The message ciphertext is sent by a service provider device to the channel partner device based on a service processing request sent by a request user after at least one message plaintext to be processed that is included in the service processing request is encrypted through a TEE of the service provider device. The service processing request is used to request to send a message to be sent in the message plaintext to a corresponding target user. A first smart contract deployed in a blockchain is invoked in the TEE of a node device. The message ciphertext is decrypted based on the first smart contract to obtain the message plaintext. The message plaintext is sent to an operator device so that the operator device sends the message to be sent in the message plaintext to the target user.

One or more embodiments of the present specification provide a service processing device. The device includes a processor. The device further includes a memory configured to store computer-executable instructions. The computer-executable instructions, when executed, enable the processor to receive a service processing request sent by a request user. The service processing request includes at least one message plaintext to be processed. The service processing request is used to request to send a message to be sent in the message plaintext to a corresponding target user. The message plaintext is encrypted based on a predetermined mode in a TEE of a service provider device to obtain a message ciphertext. The message ciphertext is sent to a channel partner device so that the channel partner device sends, based on the message ciphertext, a message processing request to a node device accessed to a blockchain. The node device sends the message plaintext obtained by decrypting the message ciphertext to an operator device in the TEE of the node device. The operator device sends the message to be sent in the message plaintext to the target user.

One or more embodiments of the present specification provide a storage medium configured to store computer-executable instructions. The computer-executable instructions, when executed, implement the followings: a message processing request sent by a channel partner device is received. The message processing request includes at least one message ciphertext to be processed. The message ciphertext is sent by a service provider device to the channel partner device based on a service processing request sent by a request user after at least one message plaintext to be processed that is included in the service processing request is encrypted through a TEE of the service provider device. The service processing request is used to request to send a message to be sent in the message plaintext to a corresponding target user. A first smart contract deployed in a blockchain is invoked in the TEE of a node device. The message ciphertext is decrypted based on the first smart contract to obtain the message plaintext. The message plaintext is sent to an operator device so that the operator device sends the message to be sent in the message plaintext to the target user.

One or more embodiments of the present specification provide a storage medium configured to store computer-executable instructions. The computer-executable instructions, when executed, implement the following: a service processing request sent by a request user is received. The service processing request includes at least one message plaintext to be processed. The service processing request is used to request to send a message to be sent in the message plaintext to a corresponding target user. The message plaintext is encrypted based on a predetermined mode in a TEE of a service provider device to obtain a message ciphertext. The message ciphertext is sent to a channel partner device so that the channel partner device sends, based on the message ciphertext, a message processing request to a node device accessed to a blockchain. The node device sends the message plaintext obtained by decrypting the message ciphertext to an operator device in the TEE of the node device. The operator device sends the message to be sent in the message plaintext to the target user.

BRIEF DESCRIPTION OF DRAWINGS

To describe the technical solutions in one or more embodiments of the present specification or in the existing technology more clearly, the following briefly introduces the accompanying drawings for describing the embodiments or the existing technology. Clearly, the accompanying drawings in the following description merely show some embodiments of the present specification, and a person of ordinary skill in the art can still derive other drawings from these accompanying drawings without creative efforts.

DESCRIPTION OF EMBODIMENTS

To make a person skilled in the art understand the technical solutions in one or more embodiments of the present specification better, the following clearly and comprehensively describes the technical solutions in the one or more embodiments of the present specification with reference to the accompanying drawings in the one or more embodiments of the present specification. Clearly, the described embodiments are merely some but not all of the embodiments of the present specification. All other embodiments obtained by a person of ordinary skill in the art based on the one or more embodiments of the present specification without creative efforts shall fall within the protection scope of the present specification.

Figure 1:
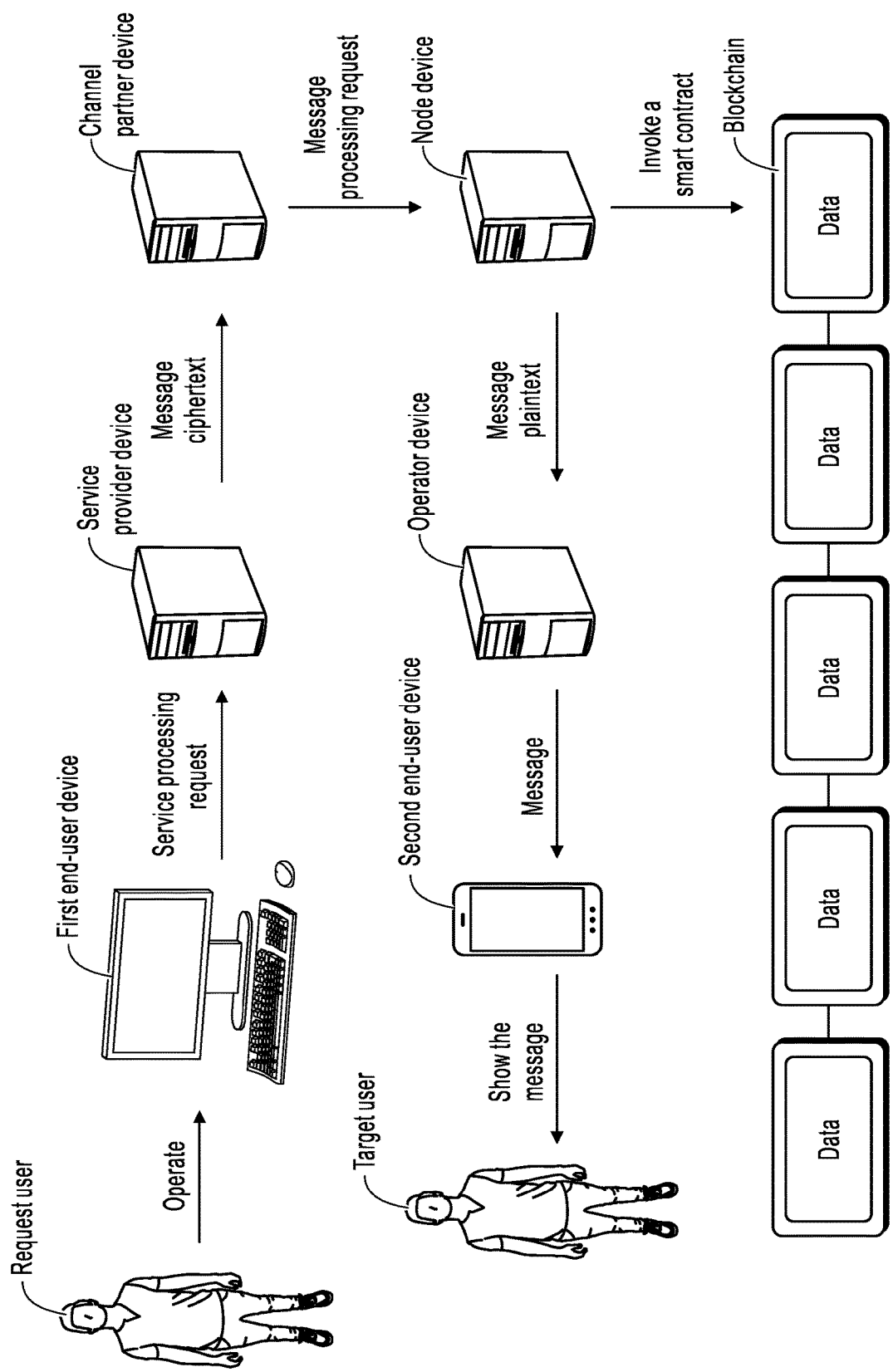
FIG. 1 is a schematic diagram illustrating a scenario of a service processing method, according to one or more embodiments of the present specification.

FIG. 1 is a schematic diagram illustrating an application scenario of a service processing method, according to one or more embodiments of the present specification. As shown in FIG. 1, the scenario includes a first end-user device of a request user, a second end-user device of at least one target user (only one is shown in FIG. 1), a service provider device, a channel partner device, an operator device, and a node device in a blockchain system accessed to a blockchain. The first end-user device and the second end-user device can each be a mobile phone, a tablet computer, a desktop computer, a portable notebook computer, etc. (only the mobile phone and the desktop computer are shown in FIG. 1). The service provider device, the channel partner device, and the operator device can each be either an end-user device, such as a mobile phone, a tablet computer, a desktop computer or a portable notebook computer; or a service provider device, such as an independent server or a server cluster composed of a plurality of servers (FIG. 1 only illustrates the independent server). The blockchain stores data, and the type of the data can be set at will as needed in practice.

Specifically, the request user operates the request user's first end-user device to edit at least one message to be sent and contact information of a corresponding target user. The first end-user device determines, in response to the operation of the request user, the obtained message to be sent and the corresponding contact information as a message plaintext, and sends a service processing request to the service provider device based on the message plaintext. The service processing request is used to request to send the message to be sent in the message plaintext to the contact information of the corresponding target user. After receiving the service processing request, the service provider device encrypts at least one message plaintext to be processed that is included in the service processing request to obtain a message ciphertext, and sends the message ciphertext to the channel partner device. The channel partner device receives the message ciphertext sent by the service provider device, and sends the message ciphertext to the node device in the blockchain system. The node device in the blockchain system invokes a first smart contract deployed in the blockchain from a trusted execution environment (TEE) of the node device when receiving the message ciphertext sent by the channel partner device, decrypts the message ciphertext based on the first smart contract to obtain the message plaintext, and sends the message plaintext to the operator device. The operator device receives the message plaintext sent by the node device and sends the message to be sent in the message plaintext to the corresponding second end-user device of the target user, and the second end-user device displays the received message.

The TEE can be realized through a program written by a predetermined programming language (i.e., realized in the form of software). The TEE can be a secure data processing environment isolated from other environments. That is, the data processing executed in the TEE and data generated in the data processing process cannot be accessed by other execution environments or application programs other than the TEE. The TEE can be realized by creating a small operating system capable of independently running in a trusted zone, etc., and the TEE can be a service that is directly provided by system calls (such as being directly processed by a kernel of the trust zone). An end-user device is taken as an example for description. The end-user device can include a rich execution environment (REE) and the TEE. Under the REE, an operating system, such as an Android operating system, an iOS operating system, a Windows operating system, and a Linux operating system, installed on the end-user device can run. The REE can include characteristics of powerful functions, good openness and good expansibility, and can provide all functions of the end-user device to an upper-layer application program, such as a camera function and a touch control function. However, the REE includes many potential security risks. For example, the operating system can obtain all data of a certain application program, but it is very difficult to verify whether the operating system or the application program is tampered; there is a great potential security risk in information of a user if the operating system or the application program is tampered. In view of this, the TEE in the end-user device is needed for processing. The TEE has its own execution space. In other words, there is also an operating system under the TEE. The TEE has a higher security level than the REE. Software and hardware resources in the end-user device that can be accessed by the TEE are separated from the REE, but the TEE can directly obtain the information of the REE, but the REE cannot obtain the information of the TEE. The TEE can encrypt, decrypt, transmit, and perform other processing on a message through a provided interface, so as to ensure that the message cannot be tampered.

In the previously described application scenario, the service provider device encrypts the message plaintext to be processed in the TEE, and sends the obtained message ciphertext to the channel partner device; and the channel partner device sends the received message ciphertext to the node device accessed to the blockchain, decrypts the message ciphertext in the TEE of the node device, and sends the obtained message plaintext to the operator device. Therefore, no user participates in the encryption and decryption of the message based on the characteristics of the TEE, and other applications in the device cannot be accessed, which ensures the authenticity and validity of the message. Meanwhile, the message is sent in the form of a ciphertext to the channel partner device. The channel partner device cannot obtain a decryption algorithm, so the channel partner device cannot obtain the message plaintext, which means that the channel partner device cannot store user data, and the privacy and security of the message are ensured. Furthermore, the decryption is performed in the TEE of the node device of the blockchain, so the problem of device-to-device mistrust is solved based on the characteristics of openness and transparency of the blockchain, and it is favorable for scaling up services. Moreover, the service provider device establishes a service channel with the channel partner device, instead of creating an exclusive service channel with the operator device, so the service cost is reduced.

Figure 2:
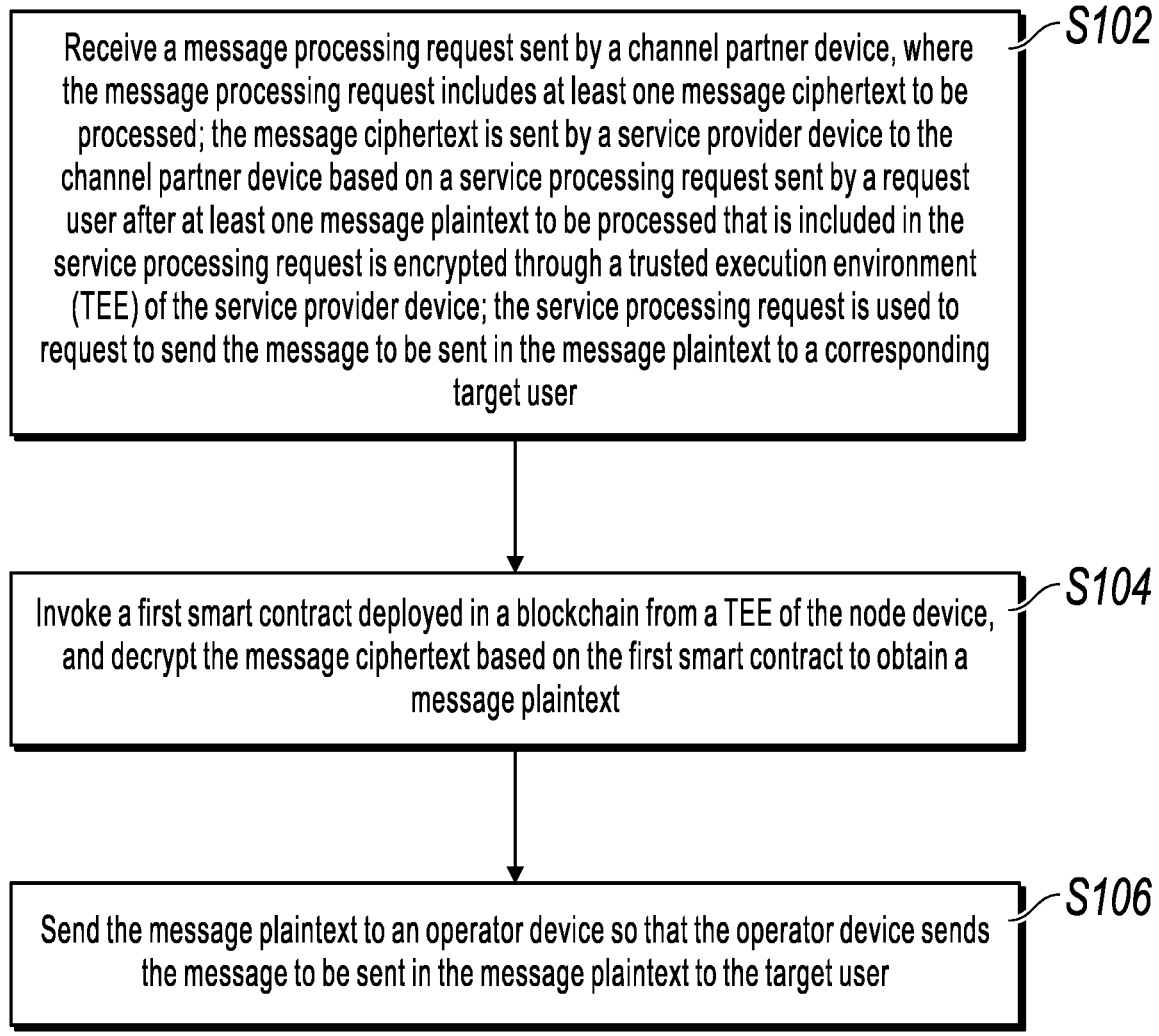
FIG. 2 is a first schematic flowchart illustrating a service processing method, according to one or more embodiments of the present specification.

One or more embodiments of the present specification provide a service processing method based on the previously described application scenario mechanism. FIG. 2 is a schematic flowchart illustrating a service processing method according to one or more embodiments of the present specification. The method in FIG. 2 can be executed by the node device in FIG. 1. As shown in FIG. 2, the method includes the following steps:

At S102, a message processing request sent by a channel partner device is received, where the message processing request includes at least one message ciphertext to be processed. The message ciphertext is sent by a service provider device to the channel partner device based on a service processing request sent by a request user after at least one message plaintext to be processed that is included in the service processing request is encrypted through a TEE of the service provider device. The service processing request is used to request to send the message to be sent in the message plaintext to a corresponding target user.

Specifically, the service processing request is sent to the service provider device according to the at least one message plaintext to be processed through a first end-user device of the request user when the request user has a service need for sending a message to at least one target user. The service provider device sends the message plaintext that is included in the service processing request to the channel partner device after it encrypts the message plaintext in its TEE. The channel partner device sends the message processing request to the node device based on the received message ciphertext. The message plaintext includes contact information of the target user, a message to be sent, etc.; the contact information is for example a phone number, an email address, etc.; and the message to be sent includes message content such as a verification code and marketing information, and can be set as needed in practice.

For example, the request user is user A, and target users are user B and user C. User A generates message plaintext to be processed 1 based on marketing information to be sent 1 and a phone number of user B, and generates message plaintext to be processed 2 based on marketing information to be sent 2 and a phone number of user C; and the service processing request is sent to the service provider device based on generated message plaintext 1 and message plaintext 2. The service provider device respectively encrypts message plaintext 1 and message plaintext 2 in its TEE, and sends obtained message ciphertext 1 and message ciphertext 2 to the channel partner device. The channel partner device sends the message processing request to the node device based on message ciphertext 1 and message ciphertext 2. Operation message 1 and operation message 2 can be the same or different.

At S104, a first smart contract deployed in a blockchain is invoked from a TEE of the node device, and the message ciphertext is decrypted based on the first smart contract to obtain the message plaintext.

At S106, the message plaintext is sent to an operator device so that the operator device sends a message to be sent in the message plaintext to the target user.

The message to be sent and the contact information of the corresponding target user are obtained by parsing each message after the operator device receives the message plaintext, and the message to be sent is sent to the contact information of the corresponding target user. The previously described example is still used for explanation. The operator device parses message plaintext 1 to obtain marketing information to be sent 1 and the mobile phone of user B, and parses message plaintext 2 to obtain marketing information to be sent 2 and the mobile phone number of user C. Marketing message 1 is sent to the mobile phone number of user B, and marketing message 2 is sent to the mobile phone number of user C.

In one or more embodiments of the present specification, the node device decrypts at least one message ciphertext that is included in the message processing request in the TEE of the node device when receiving the message processing request sent by the channel partner device, and sends the obtained message plaintext to the operator device so that the operator device sends the message to be sent in the message plaintext to the target user, where the message ciphertext is obtained by encrypting, by the service provider device through the TEE of the service provider device based on the service processing request sent by the request user, the at least one message plaintext to be processed that is included in the service processing request. Therefore, no user participates in the encryption and decryption of the message based on the characteristics of the TEE, and other applications in the device cannot be accessed, which ensures the authenticity and validity of the message. Meanwhile, the message is sent in the form of a ciphertext to the channel partner device. The channel partner device cannot obtain a decryption algorithm, so it cannot obtain the message plaintext, which means that it cannot store user data, and the privacy and security of the message are ensured. Furthermore, the decryption is performed in the TEE of the node device of the blockchain, so the problem of device-to-device mistrust is solved based on the characteristics of openness and transparency of the blockchain, and it is favorable for scaling up services. Moreover, the service provider device establishes a service channel with the channel partner device, instead of creating an exclusive service channel with the operator device, so the service cost is reduced.

Figure 3:
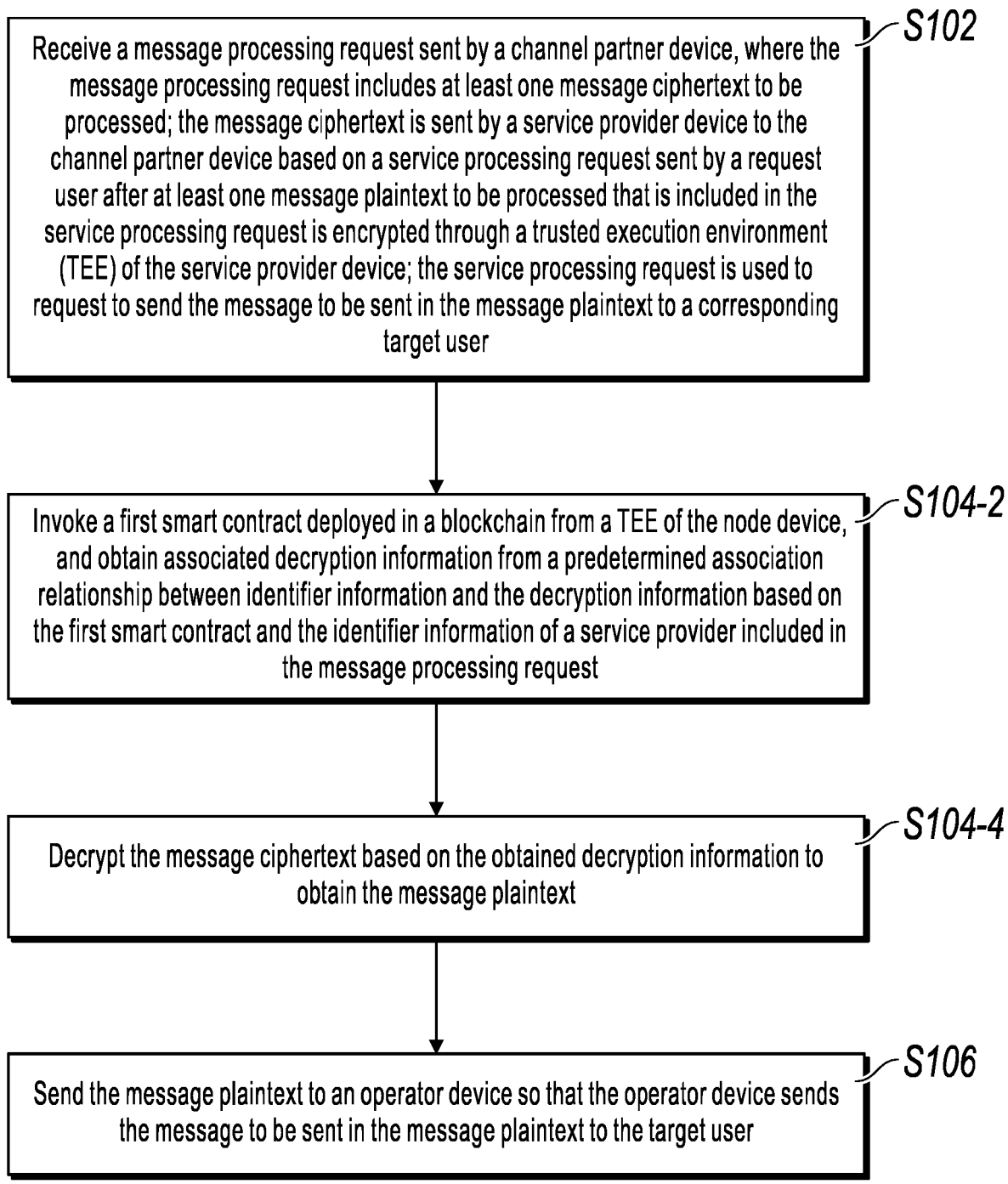
FIG. 3 is a second schematic flowchart illustrating a service processing method, according to one or more embodiments of the present specification.

Generally, different service providers have different encryption and decryption needs. In order to make the node device to perform decryption fast and accurately, in one or more embodiments of the present specification, an association relationship between identifier information of a service provider and decryption information of the service provider is predetermined, and the message processing request further includes identifier information of a service provider corresponding to the service provider device. Correspondingly, as shown in FIG. 3, step S104 includes following step S104-2 and step S104-4.

At S104-2, the first smart contract deployed in the blockchain is invoked from the TEE of the node device, and the associated decryption information is obtained from the association relationship between the predetermined identifier information and the decryption information based on the first smart contract and the identifier information of the service provider included in the message processing request.

Optionally, encryption and decryption algorithms are predetermined, and different service providers perform encryption based on its encryption key and the same set encryption algorithm. Correspondingly, decryption information includes a decryption key corresponding to the encryption key of the service provider; or the service provider can set the encryption and decryption algorithms based on needs. Correspondingly, the decryption information includes the decryption algorithm set by the service provider and the decryption key corresponding to the encryption key of the service provider.

At S104-4, the message ciphertext is decrypted based on the obtained decryption information to obtain the message plaintext.

Specifically, the message ciphertext is decrypted based on the predetermined decryption algorithm and the decryption key in the decryption information to obtain the message plaintext when the decryption information includes the decryption key corresponding to the encryption key of the service provider. The message ciphertext is decrypted based on the decryption algorithm and the decryption key in the decryption information to obtain the message plaintext when the decryption information includes the decryption algorithm set by the service provider and the decryption key corresponding to the encryption key of the service provider.

In order to ensure the security of the message for transmission between different devices, in one or more embodiments of the present specification, a first trusted application is set in the node device, a second trusted application is set in the channel partner device, and a third trusted application is set in the service provider device, where the first trusted application, the second trusted application and the third trusted application are related to message processing, and can be either the same as each other or different. The first trusted application, the second trusted application and the third trusted application can be application programs needing to be installed in corresponding devices, or can be code programs implanted into a certain hardware device of the corresponding devices, or can be programs that are installed in the operating systems of the corresponding devices in the form of plugins and run in the background. They can be specifically set according to an actual situation. Furthermore, a secure transmission channel is established between the first trusted application and the second trusted application, and a secure transmission channel is established between the second trusted application and the third trusted application. The message ciphertext is sent to the second trusted application of the channel partner device from the third trusted application in the service provider device via the secure transmission channel; and the second trusted application in the channel partner device generates the message processing request based on the received message ciphertext, and sends the message processing request to the first trusted application in the node device through the secure transmission channel. Correspondingly, as shown in FIG. 4, step S102 includes following step S102-2:

At S102-2, the message processing request sent by the second trusted application in the channel partner device is received through the first trusted application in the node device, where the first trusted application and the second trusted application are related to message processing; the message processing request includes at least one message ciphertext to be processed. The message ciphertext is sent by the service provider device to the second trusted application of the channel partner device based on the service processing request sent by the request user after at least one message plaintext to be processed that is included in the service processing request is encrypted through the TEE of the service provider device. The service processing request is used to request to send the message to be sent in the message plaintext to the corresponding target user.

Figure 4:
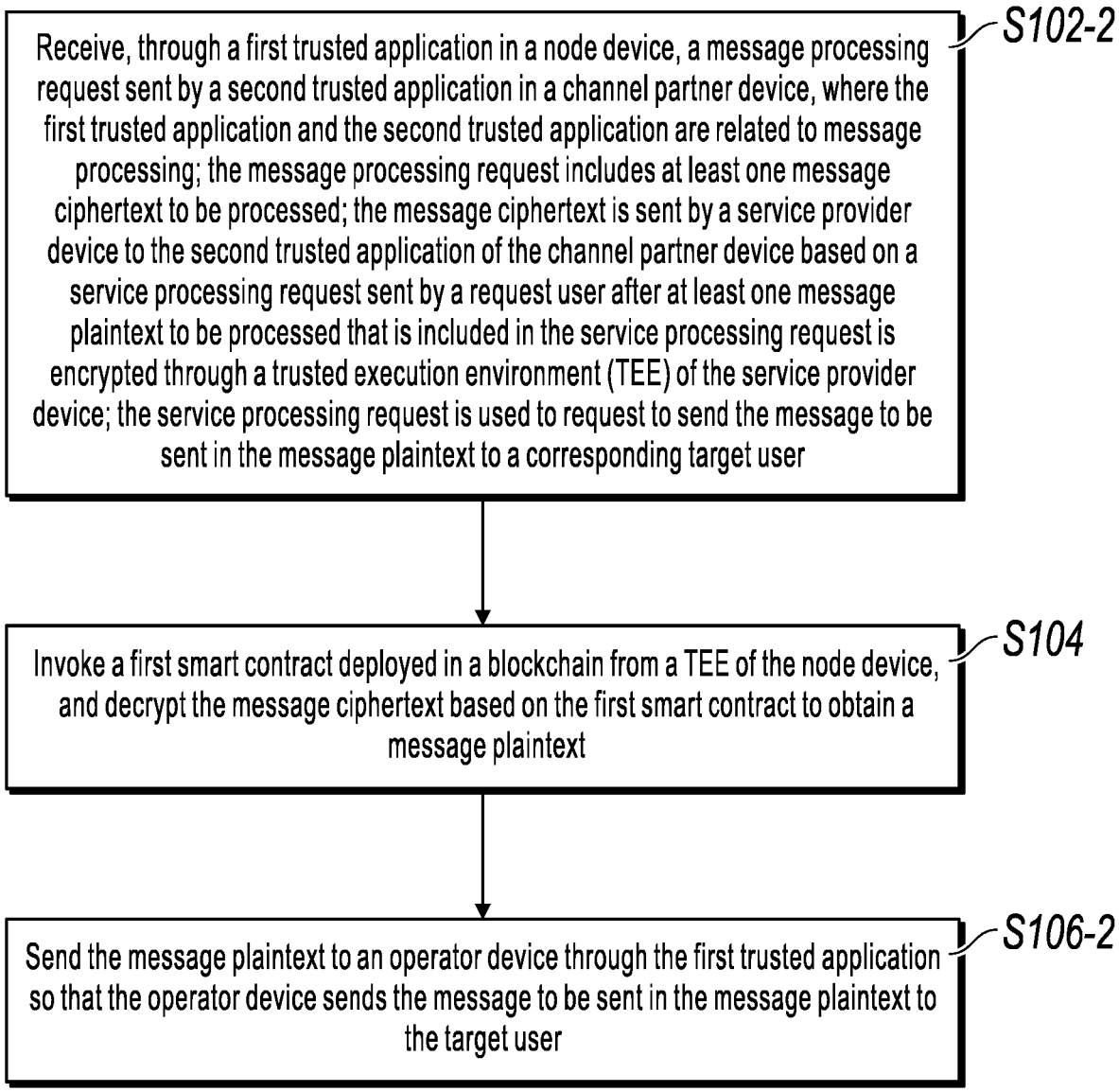
FIG. 4 is a third schematic flowchart illustrating a service processing method, according to one or more embodiments of the present specification.

Corresponding to previously described step S102-2, as shown in FIG. 4, step S106 includes following step S106-2:

At S106-2, the message plaintext is sent to the operator device through the first trusted application so that the operator device sends the message to be sent in the message plaintext to the target user.

It is worthwhile to note that a secure transmission channel can also be established between the node device and the operator device. Therefore, the message is transmitted between different devices through the secure transmission channel, which ensures the security and validity of the message.

In order to satisfy the processing needs of the messages at different security levels and satisfy the application setting needs of different node devices, the first trusted application can be set in the node device in various modes. Specifically, in one or more embodiments of the present specification, the first trusted application can be set in the TEE of the node device. Correspondingly, as shown in FIG. 5, step S102-2 includes following step S102-22:

At S102-22, the message processing request sent by the second trusted application in the channel partner device is received through the first trusted application in the TEE of the node device, where the first trusted application and the second trusted application are related to message processing; the message processing request includes at least one message ciphertext to be processed. The message ciphertext is sent by the service provider device to the second trusted application of the channel partner device based on the service processing request sent by the request user after at least one message plaintext to be processed that is included in the service processing request is encrypted through the TEE of the service provider device. The service processing request is used to request to send the message to be sent in the message plaintext to the corresponding target user.

Figure 5:
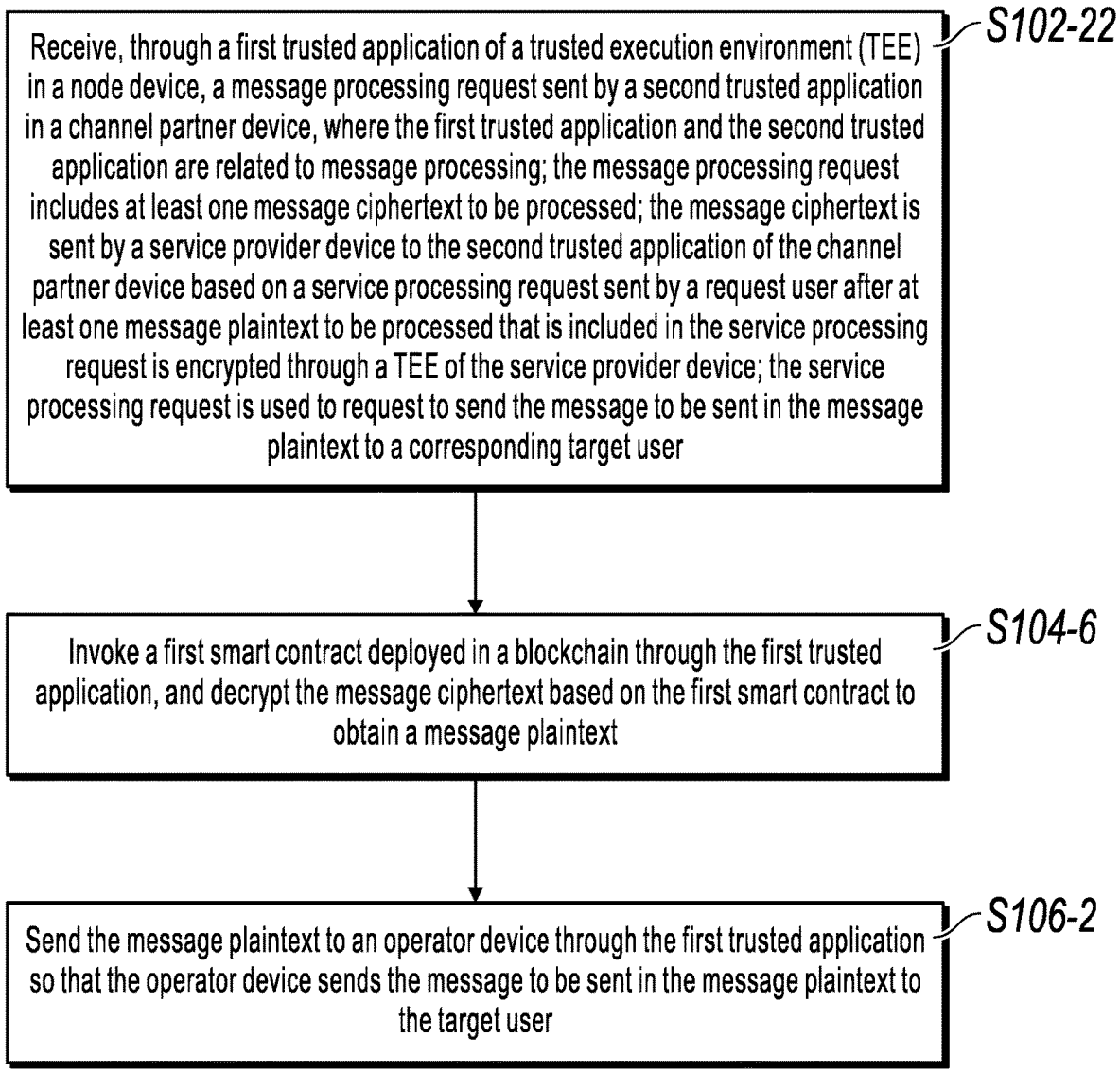
FIG. 5 is a fourth schematic flowchart illustrating a service processing method, according to one or more embodiments of the present specification.

Corresponding to step S102-22, as shown in FIG. 5, step S104 can include following step S104-6:

At S104-6, the first smart contract deployed in the blockchain is invoked through the first trusted application, and the message ciphertext is decrypted based on the first smart contract to obtain the message plaintext.

Thus, since the message processing request is directly sent from the channel partner device to the TEE of the node device when the first trusted application is set in the TEE of the node device, other execution environments of the node device or any application programs and users cannot participate in operations such as receiving of the message processing request, decryption of the message ciphertext and sending of the message plaintext. Therefore, the security and validity of the message are greatly ensured. Particularly for a message at a relatively high security level, a high-security processing need can be satisfied.

In one or more embodiments of the present specification, the first trusted application can be set outside the TEE of the node device. Correspondingly, as shown in FIG. 6, step S102-2 can include following step S102-24:

At S102-24, the message processing request sent by the second trusted application in the channel partner device is received through the first trusted application outside the TEE of the node device, where the first trusted application and the second trusted application are related to message processing; the message processing request includes at least one message ciphertext to be processed. The message ciphertext is sent by the service provider device to the second trusted application of the channel partner device based on the service processing request sent by the request user after at least one message plaintext to be processed that is included in the service processing request is encrypted through the TEE of the service provider device. The service processing request is used to request to send the message to be sent in the message plaintext to the corresponding target user.

Figure 6:
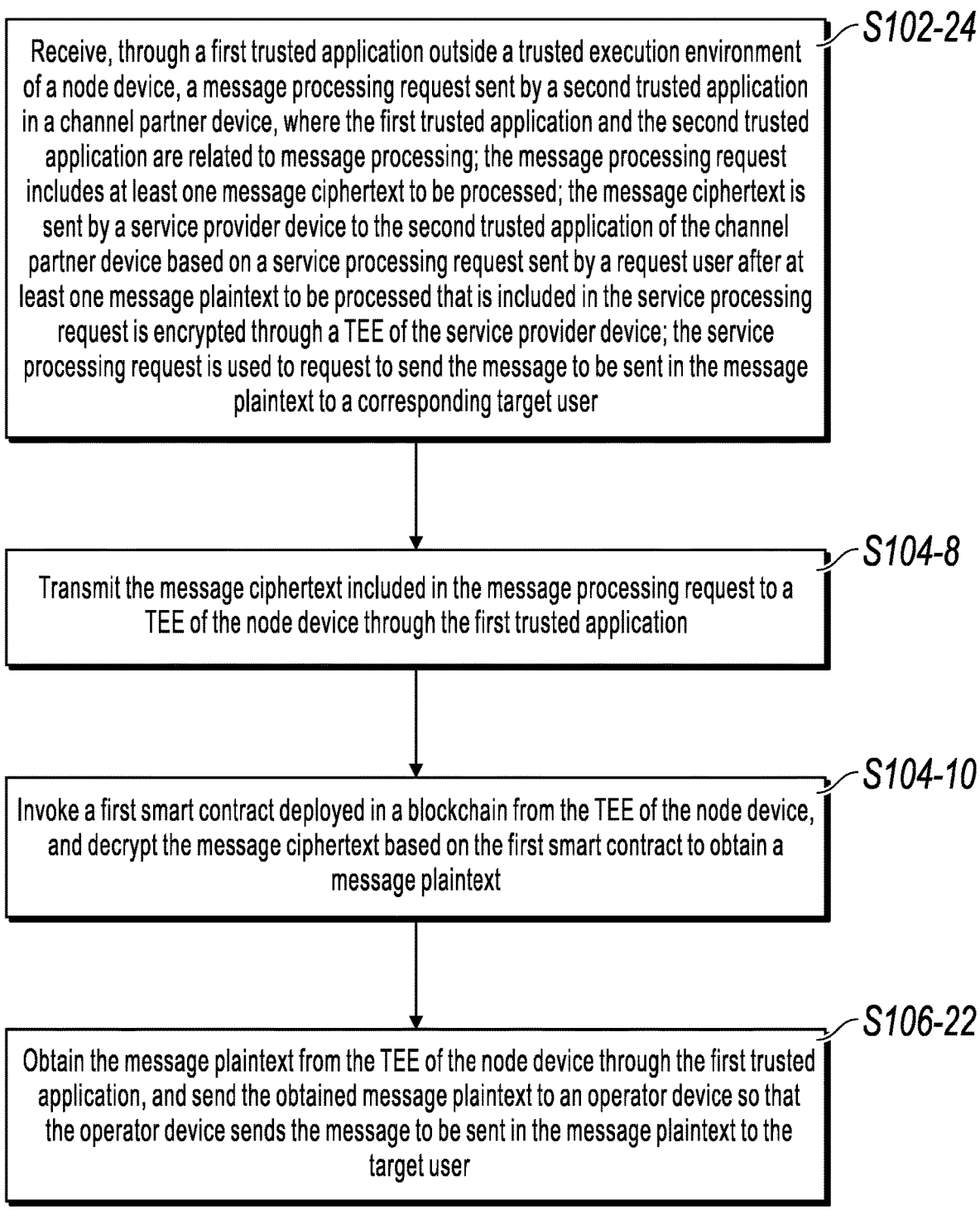
FIG. 6 is a fifth schematic flowchart illustrating a service processing method, according to one or more embodiments of the present specification.

Corresponding to step S102-24, as shown in FIG. 6, step S104 can include following step S104-8 and step S104-10:

At S104-8, the message ciphertext included in the message processing request is transmitted to the TEE of the node device through the first trusted application.

At S104-10, the first smart contract deployed in the blockchain is invoked from the TEE of the node device, and the message ciphertext is decrypted based on the first smart contract to obtain the message plaintext.

Further, corresponding to previously described step S102-24, step S104-8 and step S104-10, as shown in FIG. 6, step S106-2 includes following step S106-22:

At S106-22, the message plaintext is obtained from the TEE of the node device through the first trusted application and is sent to the operator device so that the operator device sends the message to be sent in the message plaintext to the target user.

Specifically, in order to prevent the message ciphertext from being obtained by other execution environments or any application programs of the node device, the first trusted application can be provided in advance with a security interface, and a corresponding security interface can also be set in the TEE of the node device. The secure data transmission channel can be established between the first trusted application and the TEE through the security interface between the first trusted application and the TEE. The first trusted application obtains the message ciphertext from the message processing request, transmits the message ciphertext to the TEE of the node device through the secure data transmission channel, and obtains the message plaintext from the TEE of the node device through the secure data transmission channel. The security of the message ciphertext and the message plaintext in the transmission process can be ensured through the security interface and the data transmission channel.

Therefore, the message ciphertext is transmitted to the TEE of the node device through the first trusted application based on the secure data transmission channel when the first trusted application is set outside the TEE of the node device, and is decrypted in the TEE of the node device. Other execution environments of the node device or any application programs and users cannot participate in the decryption of the message ciphertext, so the validity of the decryption operation is ensured, and the validity of the message plaintext is ensured. In addition, since the decryption is performed in the blockchain system, a tampering behavior can also be found immediately based on a consensus mechanism of the blockchain even if a certain malicious device intends to tamper the message plaintext obtained by the first trusted application from the TEE of the node device. Therefore, the security and validity of the message are ensured based on the characteristics of the TEE and the characteristics of the blockchain.

In consideration of the TEE, a secure execution environment for authorizing a security application program (or referred to as a trust application, i.e., TA) is further provided, and the confidentiality, the integrity and the access permission of resources and data of the TA are also protected. Different TAs can be ensured to be isolated through cryptography; any TA would not randomly read and operate the data of other TAs. Therefore, each TA in the TEE also needs to be authorized and runs independently from each other except the mutual independence between the TEE and the REE in the device. In addition, integrity verification needs to be performed on the TA before execution to ensure that the TA is not tampered. The TA can directly interact with peripherals such as a touch screen, a camera and a fingerprint sensor, without an interface provided by the REE of the device, thereby ensuring the security of the data. The TA can include a client program set outside the TEE and a trusted side program set in the TEE. The corresponding trusted side program in the TEE can be triggered to run through the client program, so secure data transmission can be performed between the client program and the corresponding trusted side program in the TEE. Based on this, in one or more embodiments of the present specification, the first trusted application can further include a trusted side program set in the TEE of the node device, and a client program set outside the TEE of the node device. Specifically, as shown in FIG. 7, step S102-2 can include following step S102-26:

At S102-26, the message processing request sent by the second trusted application in the channel partner device is received through the client program outside the TEE of the node device, where the message processing request includes at least one message ciphertext to be processed. The message ciphertext is sent by the service provider device to the second trusted application of the channel partner device based on the service processing request sent by the request user after at least one message plaintext to be processed that is included in the service processing request is encrypted through the TEE of the service provider device. The service processing request is used to request to send the message to be sent in the message plaintext to the corresponding target user.

Figure 7:
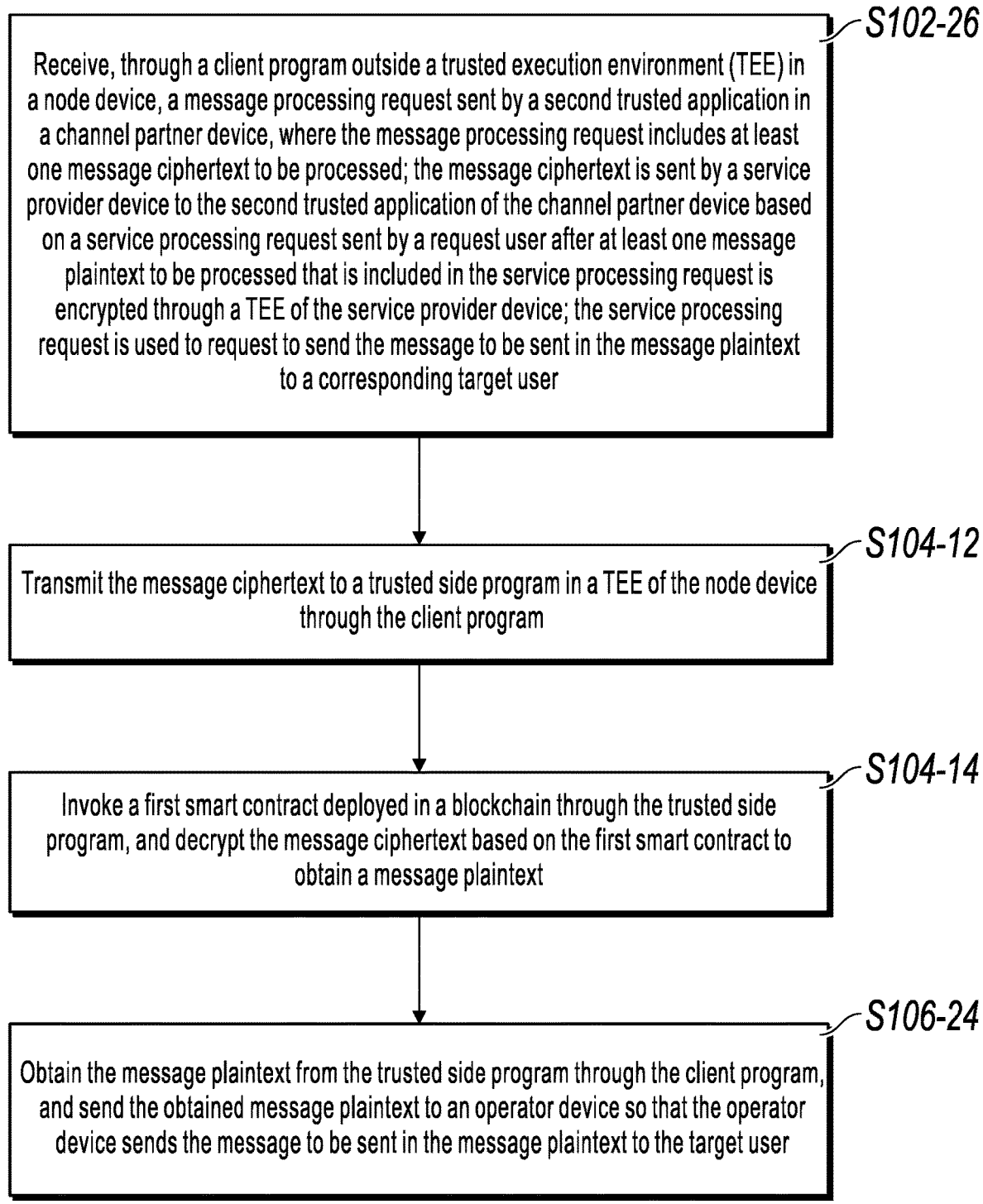
FIG. 7 is a sixth schematic flowchart illustrating a service processing method, according to one or more embodiments of the present specification.

Corresponding to step S102-26, as shown in FIG. 7, step S104 can include following step S104-12 and step S104-14:

At S104-12, the message ciphertext is transmitted to the trusted side program in the TEE of the node device through the client program.

At S104-14, the first smart contract deployed in the blockchain is invoked through the trusted side program, and the message ciphertext is decrypted based on the first smart contract to obtain the message plaintext.

Further, corresponding to step S102-26, step S104-12 and step S104-14, as shown in FIG. 7, step S106-2 includes following step S106-24:

At S106-24, the message plaintext is obtained from the trusted side program through the client program and sent to the operator device so that the operator device sends the message to be sent in the message plaintext to the target user.

It is worthwhile to note that the message plaintext can also be sent to the operator device through the trusted side program when the trusted side program has the communication capability with the operator device.

Therefore, the message ciphertext is transmitted to the trusted side program through the client program when the first trusted application includes the client program set outside the TEE of the node device and the trusted side program set in the TEE of the node device, thereby decrypting the message ciphertext in the TEE of the node device.

Other execution environments of the node device or any application programs and users cannot participate in the transmission and decryption of the message ciphertext, so the validity of the transmission and decryption operations is ensured, and the validity of the message plaintext is ensured.

It is worthwhile to note that the second trusted application can be either set in the TEE of the channel partner device or set outside the TEE of the channel partner device; and the second trusted application can also include a trusted side program set in the TEE of the channel partner device and a client program set outside the TEE of the channel partner device. For the specific implementations, references can be made to the relevant descriptions of the previously described first trusted application, and details are omitted here for simplicity.

Figure 8:
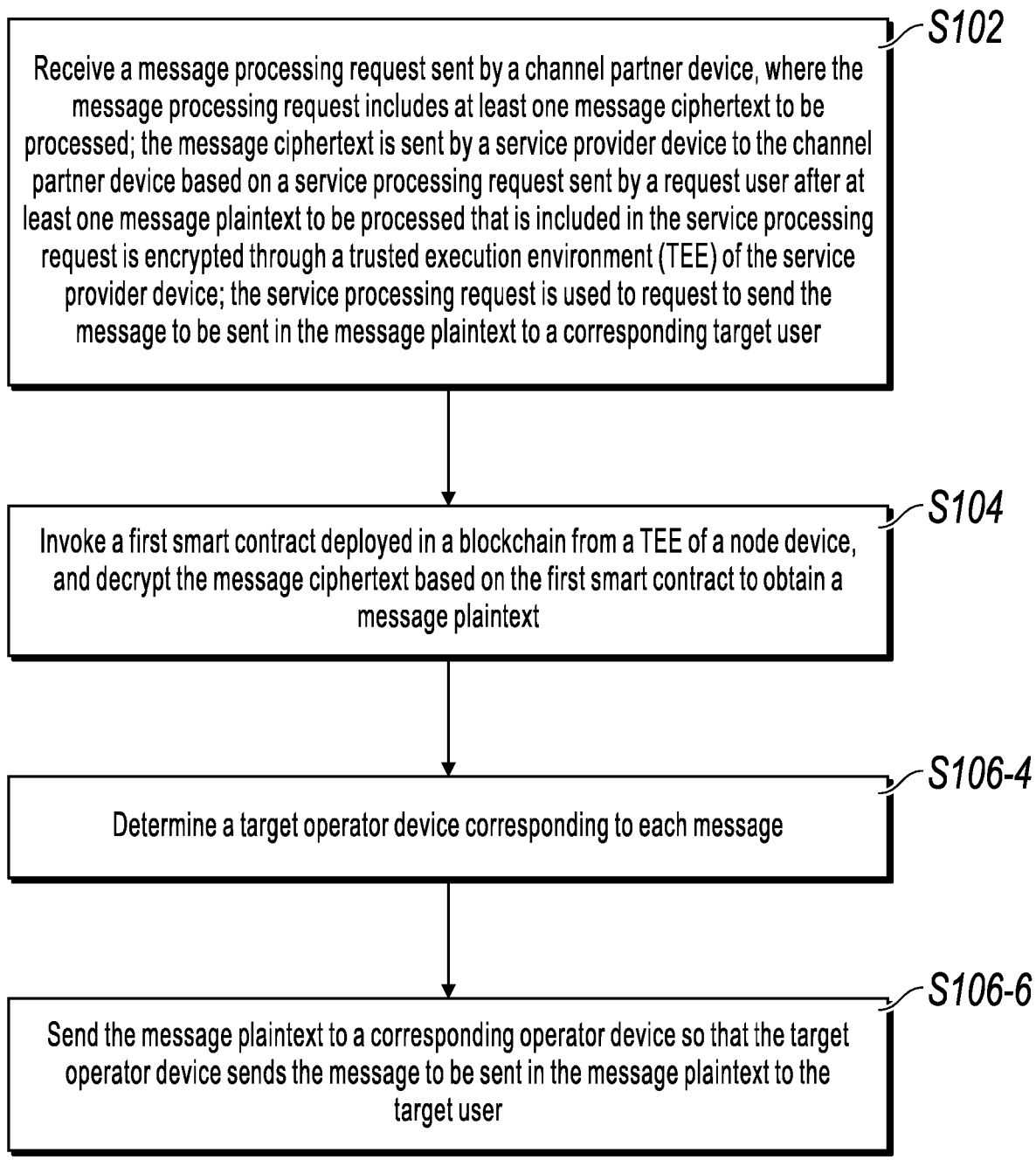
FIG. 8 is a seventh schematic flowchart illustrating a service processing method, according to one or more embodiments of the present specification.

In practice, considering that there are often multiple operators, and different target users may correspond to different operators, in order to ensure that the message to be sent can be successfully sent to the corresponding target user, in one or more embodiments of the present specification, as shown in FIG. 8, step S106 can include following step S106-4 and step S106-6:

At S106-4, a target operator device corresponding to each message plaintext is determined.

At S106-6, the message plaintext is sent to the corresponding target operator device so that the target operator device sends the message to be sent in the message plaintext to the target user.

The previously described example is still taken as an example for explanation. The node device identifies that the mobile phone number in message plaintext 1 belongs to China Mobile, determines the corresponding target operator device as an operator device of China Mobile, and sends message plaintext 1 to the operator device of China Mobile so that the operator device of China Mobile sends operation message 1 in the message plaintext 1 to the mobile phone number in message plaintext 1; and the node device identifies that the mobile phone number in message plaintext 2 belongs to China Unicom, determines the corresponding target operator device as an operator device of China Unicom, and sends message plaintext 2 to the operator device of China Unicom so that the operator device of China Unicom sends operation message 2 in the message plaintext 2 to the mobile phone number in the message plaintext 2. Therefore, it is ensured that the message to be sent can be accurately sent to the target user by means of determining the target operator device and sending the message plaintext to the corresponding target operator device.

In practice, the request user may generate a wrong message plaintext during sending of the service processing request when needing to send different messages to a plurality of target users. For example, message plaintext 1 is generated based on operation message 1 needing to be sent to user B and the mobile phone number of user C; and errors occur when the operator device sends the message to be sent, for example, operation message 1 needing to be sent to user B is sent to user C. In order to trace back to an error source in case of an error, in one or more embodiments of the present specification, the method can further include the following:

service processing record information sent by the service provider device is received, and is stored to the blockchain, where the service processing record information is generated by the service provider device based on the message ciphertext and service identifier information included in the service processing request; and a service query request sent by a querier device is received, where the service query request includes service identifier information of a service to be queried;

associated service processing record information is queried from the blockchain based on the service identifier information; and query result information is sent to the querier device based on the queried service processing record information.

The querier device can be the first end-user device of the request user, or the second end-user device of the target user, or the service provider device, or the operator device, or a device of a third-party authority, etc.

In one or more embodiments of the present specification, the node device decrypts at least one message ciphertext that is included in the message processing request in the TEE of the node device when receiving the message processing request sent by the channel partner device, and sends the obtained message plaintext to the operator device so that the operator device sends the message to be sent in the message plaintext to the target user, where the message ciphertext is obtained by encrypting, by the service provider device through the TEE of the service provider device based on the service processing request sent by the request user, the at least one message plaintext to be processed that is included in the service processing request. Therefore, no user participates in the encryption and decryption of the message based on the characteristics of the TEE, and other applications in the device cannot be accessed, which ensures the authenticity and validity of the message. Meanwhile, the message is sent in the form of a ciphertext to the channel partner device. The channel partner device cannot obtain a decryption algorithm, so it cannot obtain the message plaintext, which means that it cannot store user data, and the privacy and security of the message are ensured. Furthermore, the decryption is performed in the TEE of the node device of the blockchain, so the problem of device-to-device mistrust is solved based on the characteristics of openness and transparency of the blockchain, and it is favorable for scaling up services. Moreover, the service provider device establishes a service channel with the channel partner device, instead of creating an exclusive service channel with the operator device, so the service cost is reduced.

Figure 9:
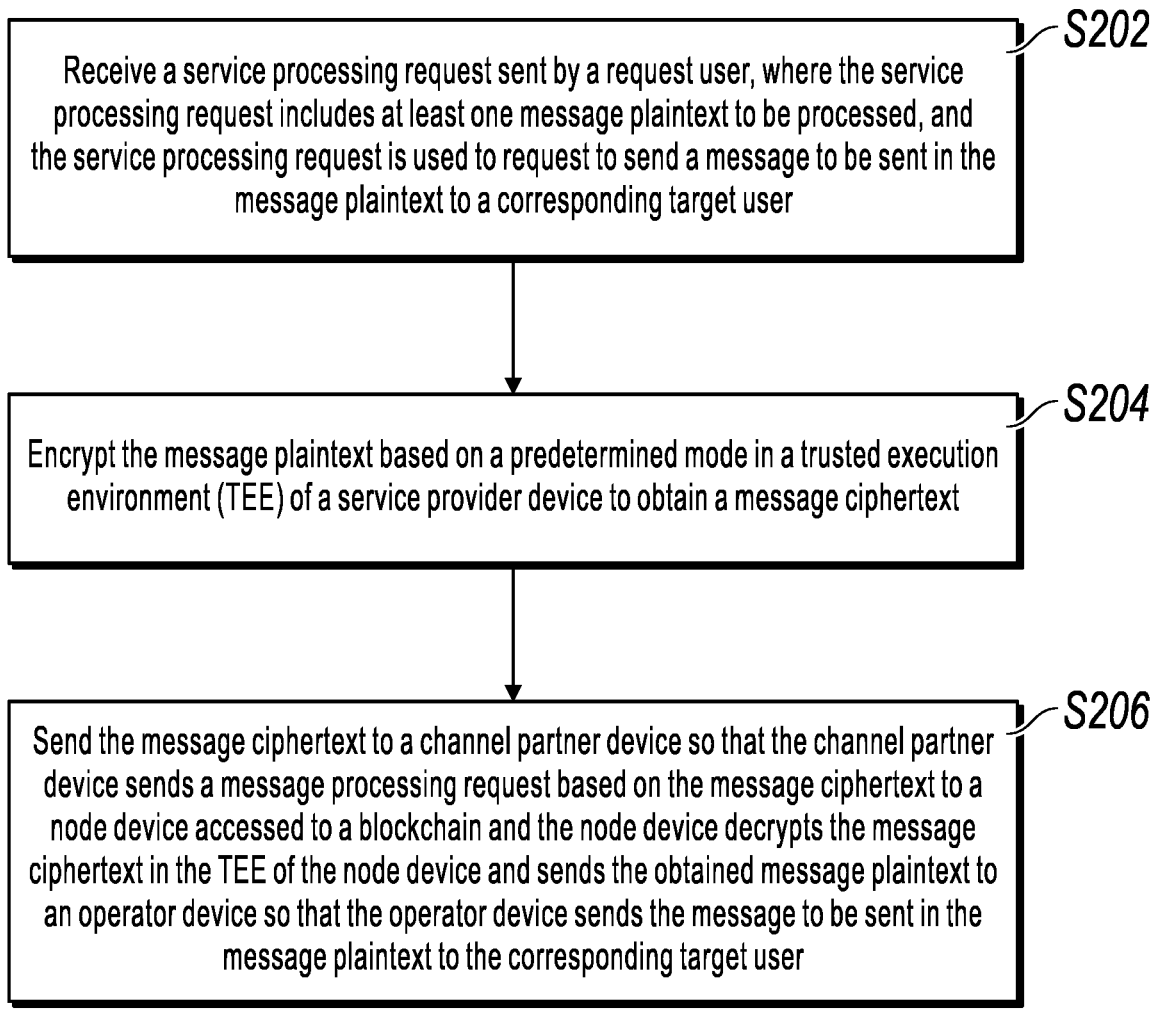
FIG. 9 is an eighth schematic flowchart illustrating a service processing method, according to one or more embodiments of the present specification.

Corresponding to the service processing methods described in previously described FIG. 2 to FIG. 8, one or more embodiments of the present specification provide another service processing method based on the same technical idea. FIG. 9 is a schematic flowchart illustrating another service processing method according to one or more embodiments of the present specification. The method in FIG. 9 can be executed by the service provider device in FIG. 1. As shown in FIG. 9, the method includes the following steps:

At S202, a service processing request sent by a request user is received, where the service processing request includes at least one message plaintext to be processed, and the service processing request is used to request to send a message to be sent in the message plaintext to a corresponding target user.

At S204, the message plaintext is encrypted based on a predetermined mode in a TEE of a service provider device to obtain a message ciphertext.

At S206, the message ciphertext is sent to a channel partner device so that the channel partner device sends, based on the message ciphertext, a message processing request to a node device accessed to a blockchain; and the node device decrypts the message ciphertext in the TEE of the node device and sends the obtained message plaintext to an operator device so that the operator device sends the message to be sent in the message plaintext to the corresponding target user.

In one or more embodiments of the present specification, the service provider device encrypts the message plaintext based on the predetermined mode in the TEE of the service provider device when receiving the service processing request sent by the request user, and sends the obtained message ciphertext to the channel partner device so that the channel partner device sends, based on the message ciphertext, the message processing request to the node device accessed to the blockchain, so the node device decrypts the message ciphertext in its TEE and sends the obtained message plaintext to the operator device so that the operator device sends the message to be sent in the message plaintext to the corresponding target user. Therefore, no user participates in the encryption and decryption of the message based on the characteristics of the TEE, and other applications in the device cannot be accessed, which ensures the authenticity and validity of the message. Meanwhile, the message is sent in the form of a ciphertext to the channel partner device. The channel partner device cannot obtain a decryption algorithm, so it cannot obtain the message plaintext, which means that it cannot store user data, and the privacy and security of the message are ensured. Furthermore, the decryption is performed in the TEE of the node device of the blockchain, so the problem of device-to-device mistrust is solved based on the characteristics of openness and transparency of the blockchain, and it is favorable for scaling up services. Moreover, the service provider device establishes a service channel with the channel partner device, instead of creating an exclusive service channel with the operator device, so the service cost is reduced.

Referring to the previously described explanation, in order to ensure the security of transmission of the message between different devices, in one or more embodiments of the present specification, a second trusted application is set in the channel partner device, and a third application related to message processing is set in the service provider device. Correspondingly, as shown in FIG. 10, step S202 includes following step S202-2:

At S202-2, the service processing request sent by the request user is received through the third trusted application related to message processing in the service provider device, where the service processing request includes at least one message plaintext to be processed, and the service processing request is used to request to send a message to be sent in the message plaintext to a corresponding target user.

Figure 10:
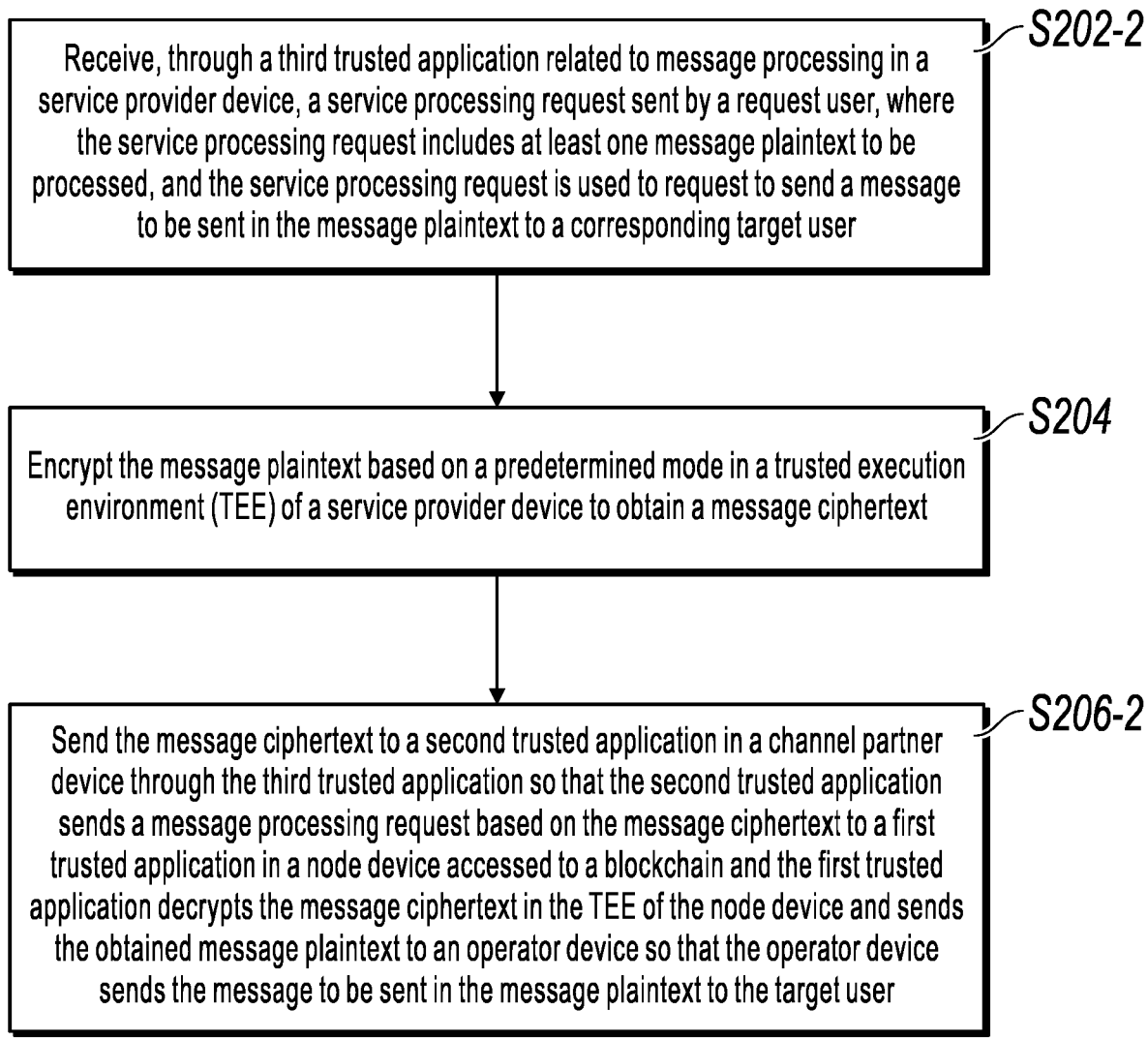
FIG. 10 is a ninth schematic flowchart illustrating a service processing method, according to one or more embodiments of the present specification.

Corresponding to step S202-2, as shown in FIG. 10, step S206 includes following step S206-2:

At S206-2, the message ciphertext is sent to the second trusted application in the channel partner device through the third trusted application so that the second trusted application sends, based on the message ciphertext, the message processing request to the first trusted application in the node device accessed to the blockchain; and the first trusted application decrypts the message ciphertext in the TEE of the node device and sends the obtained message plaintext to the operator device so that the operator device sends the message to be sent in the message plaintext to the corresponding target user.

A secure transmission channel can be established between the first trusted application and the second trusted application, and the third trusted application in the service provider device would send the message ciphertext to the second trusted application of the channel partner device through the secure transmission channel, thereby ensuring the security and validity of the message.

In order to satisfy the processing needs of the messages at different security levels and satisfy the application setting needs of different service provider devices, the third trusted application can be set in the service provider device in various modes. Specifically, in one or more embodiments of the present specification, the third trusted application can be set in the TEE of the service provider device. Correspondingly, as shown in FIG. 11, step S202-2 includes following step S202-22:

At S202-22, the service processing request sent by the request user is received through the third trusted application in the TEE of the service provider device, where the service processing request includes at least one message plaintext to be processed, and the service processing request is used to request to send a message to be sent in the message plaintext to a corresponding target user.

Figure 11:
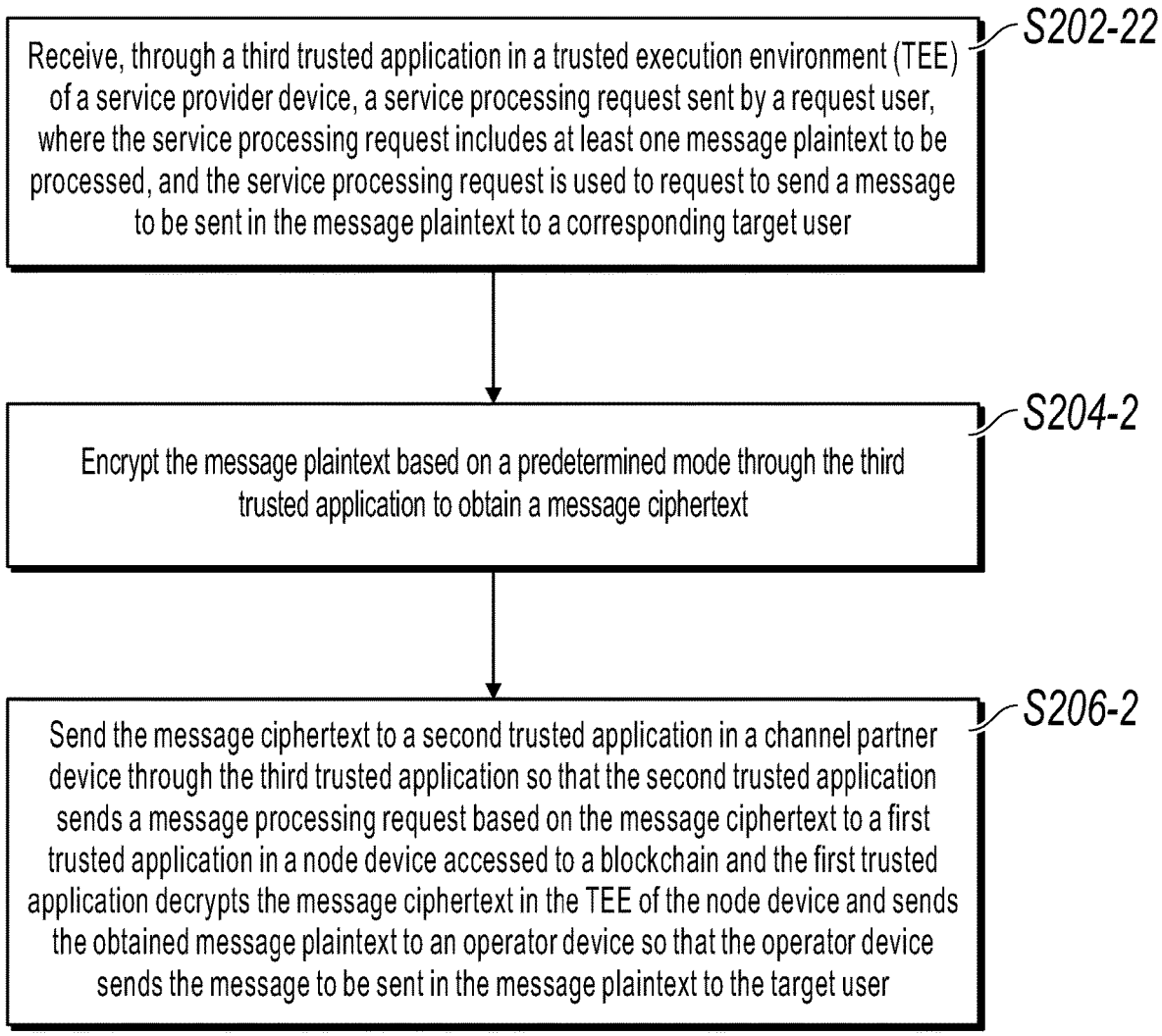
FIG. 11 is a tenth schematic flowchart illustrating a service processing method, according to one or more embodiments of the present specification.

Corresponding to step S202-22, as shown in FIG. 11, step S204 can include following step S204-2:

At S204-2, the message plaintext is encrypted based on the predetermined mode through the third trusted application to obtain the message ciphertext.

Thus, since the service processing request is directly sent from the request user to the TEE of the service provider device when the third trusted application is set in the TEE of the service provider device, other execution environments of the service provider device or any application programs and users cannot participate in processing such as receiving of the message plaintext, encryption of the message plaintext and sending of the message ciphertext. Therefore, the security and validity of the message are greatly ensured. Particularly for a message at a relatively high security level, a high-security processing need can be satisfied.

In one or more embodiments of the present specification, the third trusted application can be set outside the TEE of the service provider device. Correspondingly, as shown in FIG. 12, step S202-2 can include following step S202-24:

At S202-24, the service processing request sent by the request user is received through the third trusted application outside the TEE of the service provider device, where the service processing request includes at least one message plaintext to be processed, and the service processing request is used to request to send a message to be sent in the message plaintext to a corresponding target user.

Figure 12:
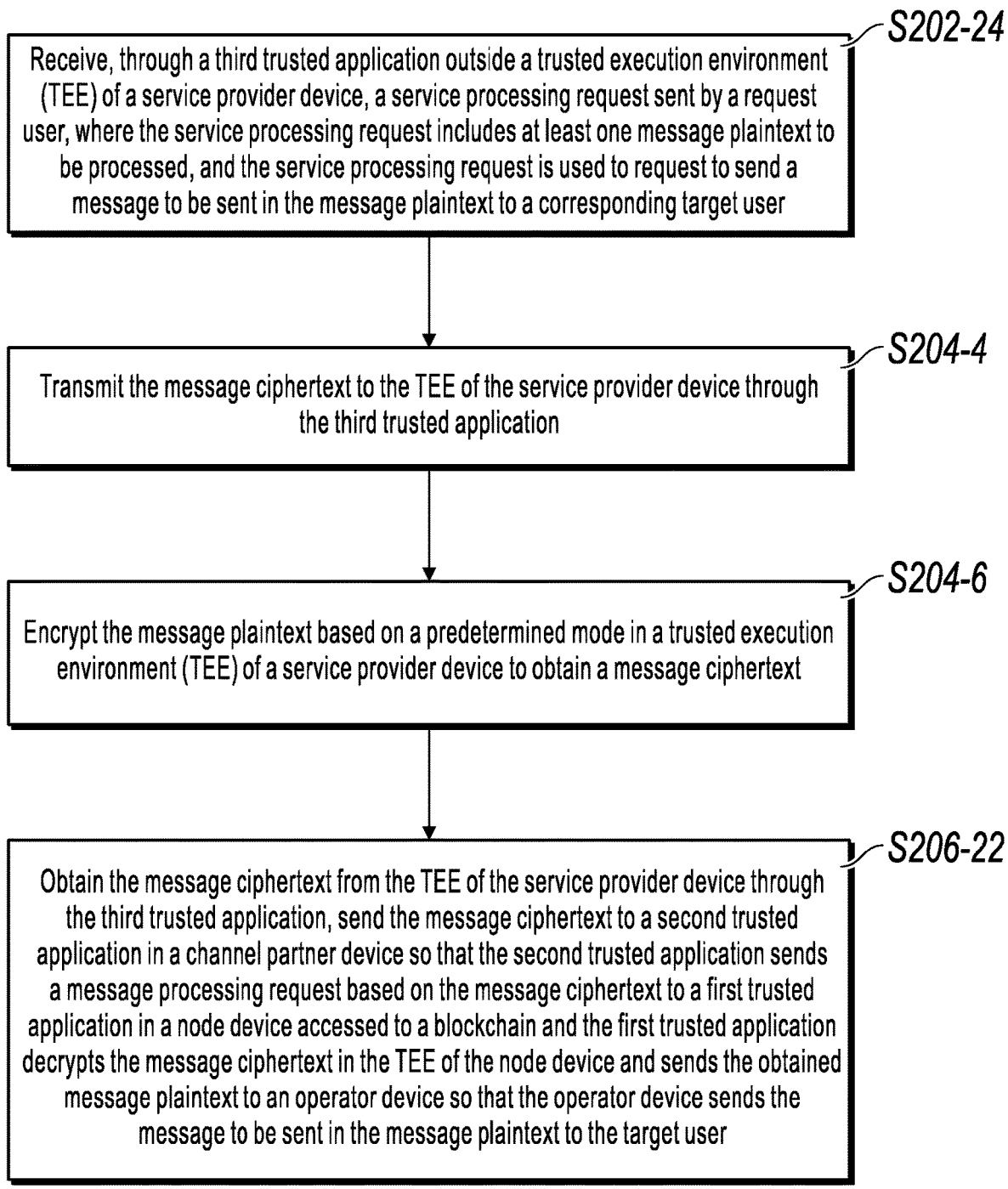
FIG. 12 is an eleventh schematic flowchart illustrating a service processing method, according to one or more embodiments of the present specification.

Corresponding to step S202-24, as shown in FIG. 12, step S204 can include following step S204-4 and step S204-6:

At S204-4, the message plaintext is transmitted to the TEE of the service provider device through the third trusted application.

At S204-6, the message plaintext is encrypted based on the predetermined mode in the TEE of the service provider device to obtain the message ciphertext.

Further, corresponding to step S202-24, step S204-4 and step S204-6, as shown in FIG. 12, step S206-2 includes following step S206-22:

At S206-22, the message ciphertext is obtained from the TEE of the service provider device through the third trusted application, and is sent to the second trusted application in the channel partner device through the third trusted application so that the second trusted application sends, based on the message ciphertext, the message processing request to the first trusted application in the node device accessed to the blockchain; and the first trusted application decrypts the message ciphertext in the TEE of the node device and sends the obtained message plaintext to the operator device so that the operator device sends the message to be sent in the message plaintext to the corresponding target user.

Specifically, in order to prevent the message plaintext from being obtained by other execution environments or any application programs of the service provider device, the third trusted application can be provided in advance with a security interface, and a corresponding security interface can also be set in the TEE of the channel partner device. The secure data transmission channel can be established between the third trusted application and the TEE through the security interface between the third trusted application and the TEE of the service provider device. The third trusted application obtains the message plaintext from the service processing request, transmits it to the TEE of the node device through the secure data transmission channel, and obtains the message ciphertext from the TEE of the node device through the secure data transmission channel. The security of the message plaintext and the message ciphertext in the transmission process can be ensured through the security interface and the data transmission channel.

Therefore, the message plaintext is transmitted to the TEE of the service provider device through the third trusted application based on the secure data transmission channel when the third trusted application is set outside the TEE of the service provider device, and is encrypted in the TEE of the service provider device. Other execution environments of the service provider device or any application programs and users cannot participate in the encryption of the message plaintext, so the validity of the encryption operation is ensured, and the validity of the message ciphertext is ensured.

In consideration of the TEE, a secure execution environment for authorizing a security application program (or referred to as a trust application, i.e., TA) is further provided, and the confidentiality, the integrity and the access permission of resources and data of the TA are also protected. Different TAs can be ensured to be isolated through cryptography; any TA would not randomly read and operate the data of other TAs. Therefore, each TA in the TEE also needs to be authorized and runs independently from each other except the mutual independence between the TEE and the REE in the device. In addition, integrity verification needs to be performed on the TA before execution to ensure that the TA is not tampered. The TA can directly interact with peripherals such as a touch screen, a camera and a fingerprint sensor, without an interface provided by the REE of the device, thereby ensuring the security of the data. The TA can include a client program set outside the TEE and a trusted side program set in the TEE. The corresponding trusted side program in the TEE can be triggered to run through the client program, so secure data transmission can be performed between the client program and the corresponding trusted side program in the TEE. Based on this, in one or more embodiments of the present specification, the third trusted application can further include a trusted side program set in the TEE of the service provider device, and a client program set outside the TEE of the service provider device. Specifically, as shown in FIG. 13, step S202-2 can include following step S202-26:

At S202-26, the service processing request sent by the request user is received through the client program outside the TEE of the service provider device, where the service processing request includes at least one message plaintext to be processed, and the service processing request is used to request to send the message to be sent in the message plaintext to the corresponding target user.

Figure 13:
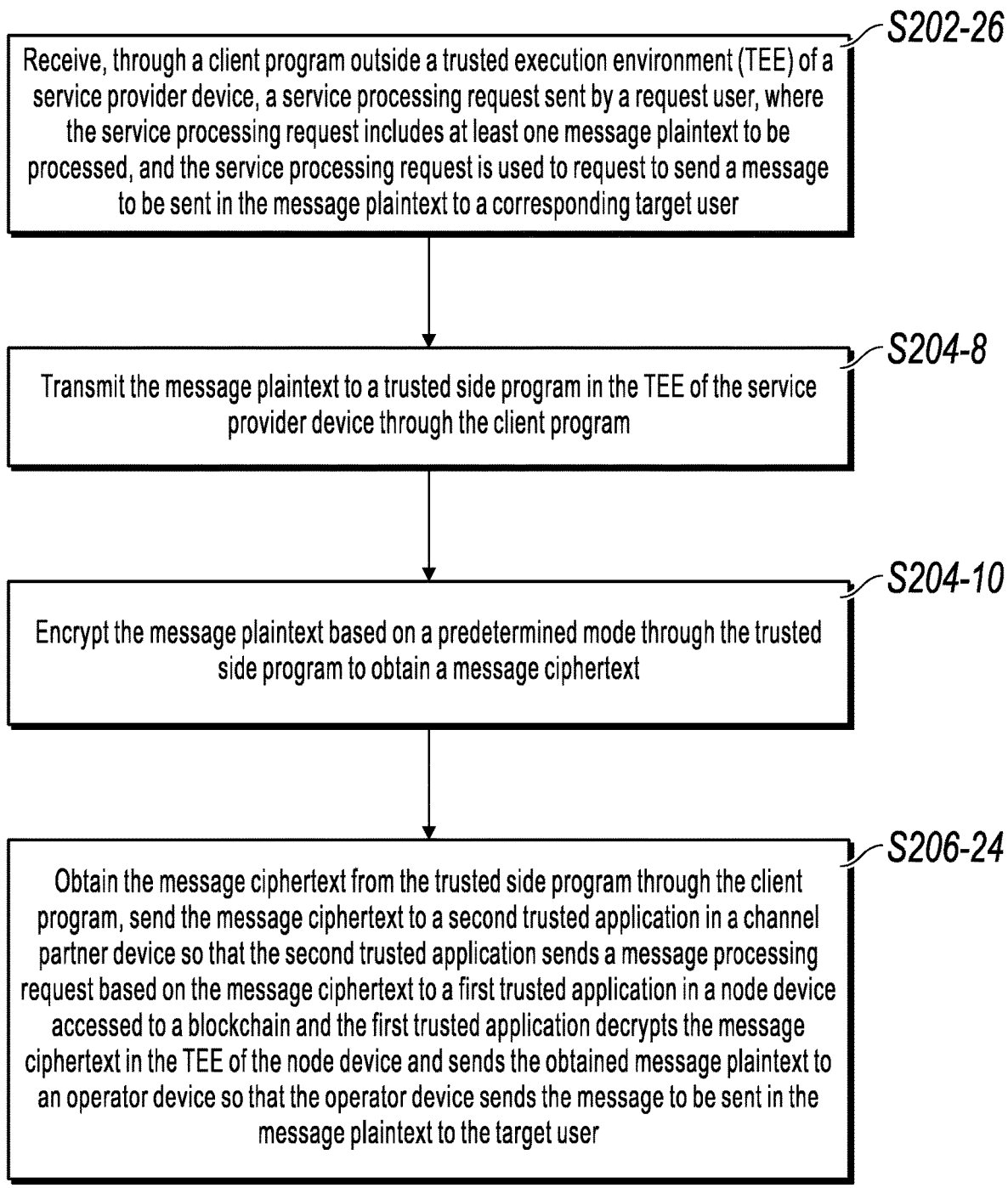
FIG. 13 is a twelfth schematic flowchart illustrating a service processing method, according to one or more embodiments of the present specification.

Corresponding to step S202-26, as shown in FIG. 13, step S204 can include following step S204-8 and step S204-10:

At S204-8, the message plaintext is transmitted to the trusted side program in the TEE of the service provider device through the client program.

At S204-10, the message plaintext is encrypted based on the predetermined mode through the trusted side program to obtain the message ciphertext.

Further, corresponding to step S202-26, step S204-8 and step S204-10, as shown in FIG. 13, step S206-2 includes following step S206-24:

At S206-24, the message ciphertext is obtained from the trusted side program through the client program, and is sent to the second trusted application in the channel partner device so that the second trusted application sends, based on the message ciphertext, the message processing request to the first trusted application in the node device accessed to the blockchain; and the first trusted application decrypts the message ciphertext in the TEE of the node device and sends the obtained message plaintext to the operator device so that the operator device sends the message to be sent in the message plaintext to the corresponding target user.

It is worthwhile to note that the message ciphertext can also be sent to the operator device through the trusted side program when the trusted side program has the communication capability with the channel partner device.

Therefore, the message plaintext is transmitted to the trusted side program through the client program when the third trusted application includes the client program set outside the TEE of the service provider device and the trusted side program set in the TEE of the service provider device, thereby encrypting the message plaintext in the TEE of the service provider device. Other execution environments of the service provider device or any application programs and users cannot participate in the transmission and encryption of the message ciphertext, so the validity of the transmission and decryption operations is ensured, and the validity of the message ciphertext is ensured.

Figure 14:
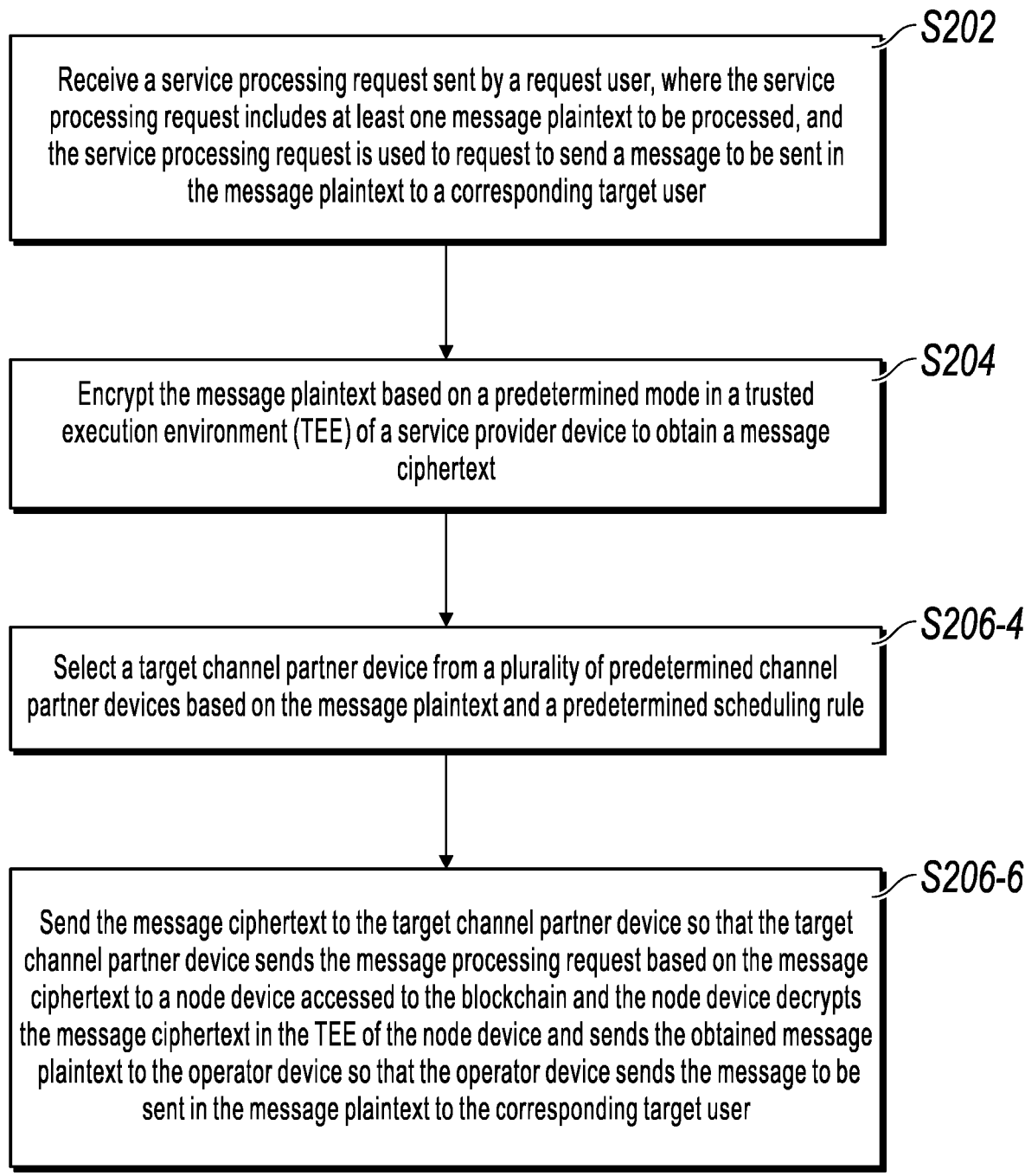
FIG. 14 is a thirteenth schematic flowchart illustrating a service processing method, according to one or more embodiments of the present specification.

Further, considering that bandwidths, data throughputs, etc. of different channel partner devices are often different, the service capabilities of different channel partner devices are often different. In order to avoid sending a large quantity of message ciphertexts to the channel partner device with relatively low service processing capability to cause low message processing efficiency, in one or more embodiments of the present specification, a scheduling rule is predetermined, and a target channel partner device is determined based on the scheduling rule. Correspondingly, as shown in FIG. 14, step S206 includes following step S206-4 and step S206-6.

At S206-4, a target channel partner device is selected from a plurality of predetermined channel partner devices based on the message plaintext and the predetermined scheduling rule.

The scheduling rule can be customized as needed in practice. No specific limitation is made in the present specification. For example, the quantity of message ciphertexts that can be taken by each channel partner device is predetermined, and a matching channel partner device is determined based on the quantity of message ciphertexts to be processed.

At S206-6, the message ciphertext is sent to the target channel partner device so that the target channel partner device sends, based on the message ciphertext, the message processing request to the node device accessed to the blockchain; and the node device decrypts the message ciphertext in the TEE of the node device and sends the obtained message plaintext to the operator device so that the operator device sends the message to be sent in the message plaintext to the corresponding target user.

Thus, determining the target channel partner device based on the predetermined scheduling rule and sending the message ciphertext to target channel partner device realized reasonable scheduling of the channel partner device and improved the message processing efficiency.

Figure 15:
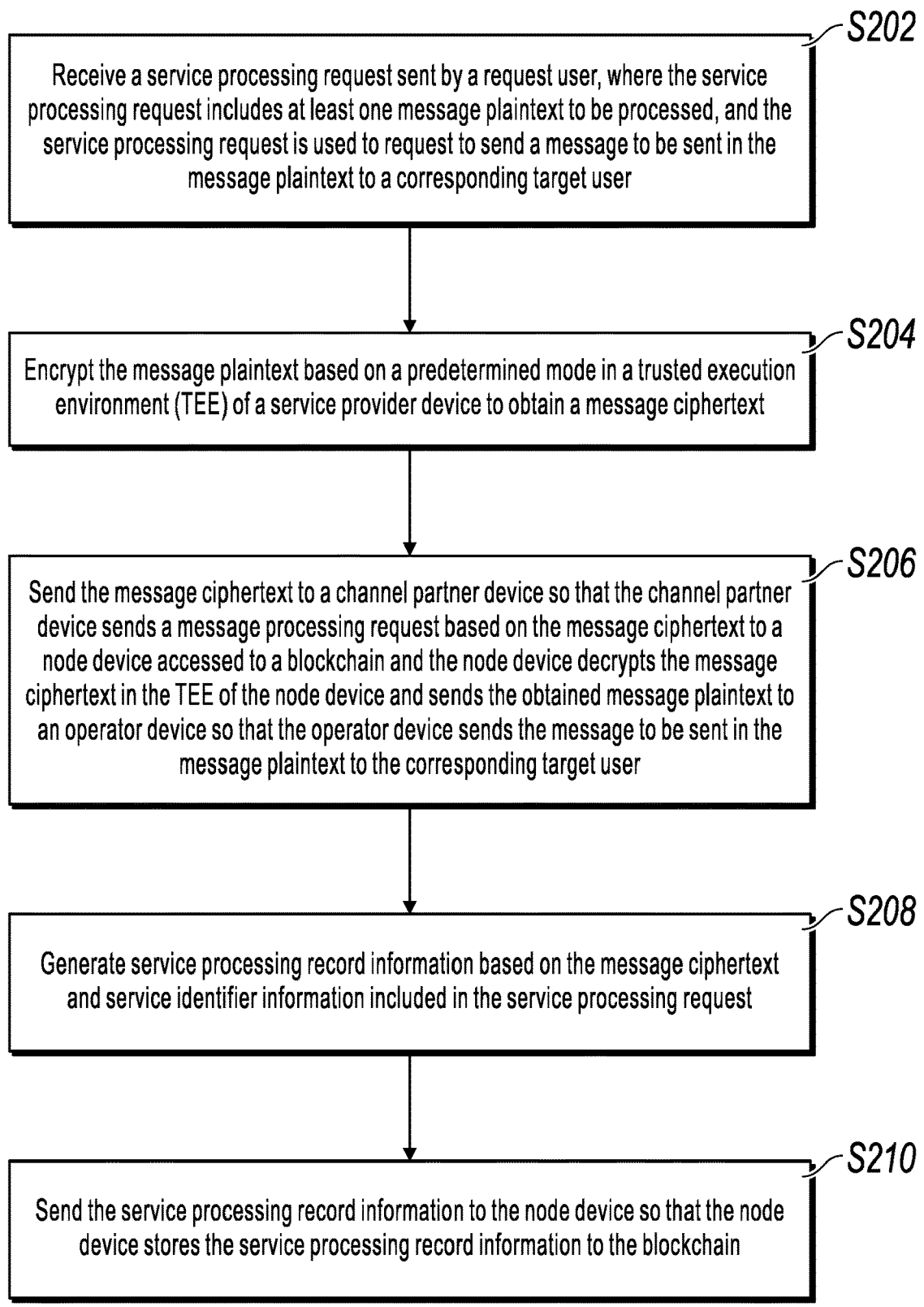
FIG. 15 is a fourteenth schematic flowchart illustrating a service processing method, according to one or more embodiments of the present specification.

In practice, the request user may generate a wrong message plaintext during sending of the service processing request when it is necessary to send different messages to a plurality of target users. For example, message plaintext 1 is generated based on operation message 1 needing to be sent to user B and the mobile phone number of user C; and errors occur when the operator device sends the message to be sent, for example, operation message 1 needing to be sent to user B is sent to user C. In order to trace back to an error source in case of an error, in one or more embodiments of the present specification, as shown in FIG. 15, after step S206, the method further includes:

At S208, service processing record information is generated based on the message ciphertext and service identifier information included in the service processing request;

At S210, the service processing record information is sent to the node device so that the node device stores the service processing record information to the blockchain.

In one or more embodiments of the present specification, the service provider device encrypts the message plaintext based on the predetermined mode in the TEE of the service provider device when receiving the service processing request sent by the request user, and sends the obtained message ciphertext to the channel partner device so that the channel partner device sends the message processing request to the node device accessed to the blockchain, so the node device decrypts the message ciphertext in its TEE and sends the obtained message plaintext to the operator device so that the operator device sends the message to be sent in the message plaintext to the corresponding target user. Therefore, no user participates in the encryption and decryption of the message based on the characteristics of the TEE, and other applications in the device cannot be accessed, which ensures the authenticity and validity of the message. Meanwhile, the message is sent in the form of a ciphertext to the channel partner device. The channel partner device cannot obtain a decryption algorithm, so it cannot obtain the message plaintext, which means that it cannot store user data, and the privacy and security of the message are ensured. Furthermore, the decryption is performed in the TEE of the node device of the blockchain, so the problem of device-to-device mistrust is solved based on the characteristics of openness and transparency of the blockchain, and it is favorable for scaling up services. Moreover, the service provider device establishes a service channel with the channel partner device, instead of creating an exclusive service channel with the operator device, so the service cost is reduced.

Figure 16:
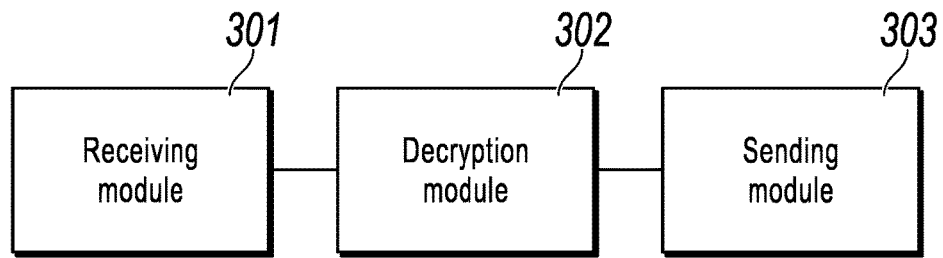
FIG. 16 is a schematic diagram illustrating a first module composition of a service processing apparatus, according to one or more embodiments of the present specification.

Corresponding to the previously described service processing method in FIG. 2 to FIG. 8, one or more embodiments of the present specification further provide a service processing apparatus based on the same technical idea. FIG. 16 is a schematic diagram illustrating a module composition of a service processing apparatus according to one or more embodiments of the present specification. The apparatus is configured to implement the service processing method described in FIG. 2 to FIG. 8. As shown in FIG. 16, the apparatus includes:

a receiving module 301, configured to receive a message processing request sent by a channel partner device, where the message processing request includes at least one message ciphertext to be processed; the message ciphertext is sent by the service provider device to the channel partner device based on a service processing request sent by a request user after at least one message plaintext to be processed that is included in the service processing request is encrypted through a TEE of the service provider device; the service processing request is used to request to send the message to be sent in the message plaintext to a corresponding target user;

a decryption module 302, configured to invoke a first smart contract deployed in a blockchain from a TEE of the node device, and decrypt the message ciphertext based on the first smart contract to obtain the message plaintext; and a sending module 303, configured to send the message plaintext to an operator device so that the operator device sends the message to be sent in the message plaintext to the target user.

The service processing apparatus provided by one or more embodiments of the present specification decrypts at least one message ciphertext that is included in the message processing request in the TEE of the node device when receiving the message processing request sent by the channel partner device, and sends the obtained message plaintext to the operator device so that the operator device sends the message to be sent in the message plaintext to the target user, where the message ciphertext is obtained by encrypting, by the service provider device through the TEE of the service provider device based on the service processing request sent by the request user, the at least one message plaintext to be processed that is included in the service processing request. Therefore, no user participates in the encryption and decryption of the message based on the characteristics of the TEE, and other applications in the device cannot be accessed, which ensures the authenticity and validity of the message. Meanwhile, the message is sent in the form of a ciphertext to the channel partner device. The channel partner device cannot obtain a decryption algorithm, so it cannot obtain the message plaintext, which means that it cannot store user data, and the privacy and security of the message are ensured. Furthermore, the decryption is performed in the TEE of the node device of the blockchain, so the problem of device-to-device mistrust is solved based on the characteristics of openness and transparency of the blockchain, and it is favorable for scaling up services. Moreover, the service provider device establishes a service channel with the channel partner device, instead of creating an exclusive service channel with the operator device, so the service cost is reduced.

Optionally, the message processing request further includes identifier information of a service provider corresponding to the service provider device.

The decryption module 302 obtains associated decryption information from a predetermined association relationship between the identifier information and the decryption information based on the first smart contract and the identifier information, and decrypts the message ciphertext based on the obtained decryption information to obtain the message plaintext.

Optionally, the receiving module 301 receives the message processing request sent by a second trusted application in the channel partner device through a first trusted application in the node device, where the first trusted application and the second trusted application are related to message processing.

The sending module 303 sends the message plaintext to the operator device through the first trusted application.

Optionally, the first trusted application is set in the TEE of the node device.

The decryption module 302 invokes the first smart contract deployed in the blockchain through the first trusted application.

Optionally, the first trusted application is set outside the TEE of the node device.

The decryption module 302 transmits the message ciphertext to the TEE of the node device through the first trusted application, and invokes the first smart contract deployed in the blockchain from the TEE of the node device.

The sending module 303 obtains the message plaintext from the TEE of the node device through the first trusted application, and sends the obtained message plaintext to the operator device.

Optionally, the first trusted application includes a trusted side program set in the TEE of the node device, and a client program set outside the TEE of the node device.

The receiving module 301 receives the message processing request sent by the second trusted application in the channel partner device through the client program in the node device;

the decryption module 302 transmits the message ciphertext to the trusted side program through the client program, and invokes the first smart contract deployed in the blockchain through the trusted side program; and the sending module 303 obtains the message plaintext from the trusted side program through the client program, and sends the obtained message plaintext to the operator device.

Optionally, the sending module 303 determines a target operator device corresponding to each message plaintext, and sends the message plaintext to the corresponding target operator device so that the target operator device sends the message to be sent in the message plaintext to the target user.

Optionally, the apparatus further includes a storage module and a query module.

The receiving module 301 also receives service processing record information sent by the service provider device;

the storage module stores the service processing record information to the blockchain, where the service processing record information is generated by the service provider device based on the message ciphertext and service identifier information included in the service processing request;

the receiving module 301 also receives a service query request sent by a querier device, where the service query request includes service identifier information of a service to be queried;

the query module queries associated service processing record information from the blockchain based on the service identifier information, and sends query result information to the querier device based on the queried service processing record information.

The service processing apparatus provided by one or more embodiments of the present specification decrypts at least one message ciphertext that is included in the message processing request in the TEE of the node device when receiving the message processing request sent by the channel partner device, and sends the obtained message plaintext to the operator device so that the operator device sends the message to be sent in the message plaintext to the target user, where the message ciphertext is obtained by encrypting, by the service provider device through the TEE of the service provider device based on the service processing request sent by the request user, the at least one message plaintext to be processed that is included in the service processing request. Therefore, no user participates in the encryption and decryption of the message based on the characteristics of the TEE, and other applications in the device cannot be accessed, which ensures the authenticity and validity of the message. Meanwhile, the message is sent in the form of a ciphertext to the channel partner device. The channel partner device cannot obtain a decryption algorithm, so it cannot obtain the message plaintext, which means that it cannot store user data, and the privacy and security of the message are ensured. Furthermore, the decryption is performed in the TEE of the node device of the blockchain, so the problem of device-to-device mistrust is solved based on the characteristics of openness and transparency of the blockchain, and it is favorable for scaling up services. Moreover, the service provider device establishes a service channel with the channel partner device, instead of creating an exclusive service channel with the operator device, so the service cost is reduced.

It is worthwhile to note that the embodiments of the service processing apparatus in the present specification and the embodiments of the service processing method in the present specification are based on the same inventive idea, so for the specific implementation of the embodiments, reference can be made to the implementation of the previously described corresponding service processing method, and repetitions are omitted.

Figure 17:
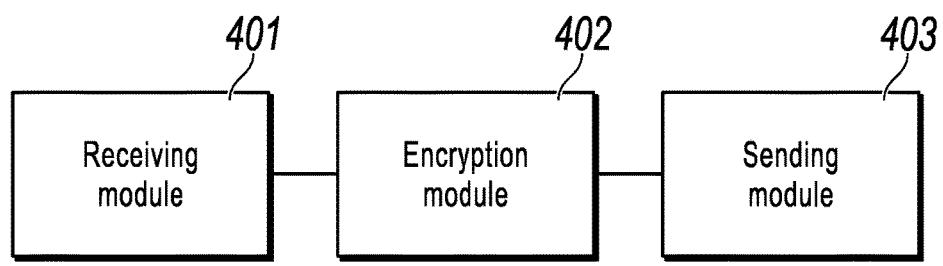
FIG. 17 is a schematic diagram illustrating a second module composition of a service processing apparatus, according to one or more embodiments of the present specification.

Further, corresponding to the previously described service processing methods in FIG. 9 to FIG. 15, one or more embodiments of the present specification further provide another service processing apparatus based on the same technical idea. FIG. 17 is a schematic diagram illustrating a module composition of another service processing apparatus according to one or more embodiments of the present specification. The apparatus is configured to implement the service processing method described in FIG. 9 to FIG. 15. As shown in FIG. 17, the apparatus includes:

a receiving module 401, configured to receive a service processing request sent by a request user, where the service processing request includes at least one message plaintext to be processed, and the service processing request is used to request to send a message to be sent in the message plaintext to a corresponding target user;

an encryption module 402, configured to encrypt the message plaintext based on a predetermined mode in a TEE of the service provider device to obtain a message ciphertext;

a sending module 403, configured to send the message ciphertext to a channel partner device so that the channel partner device sends, based on the message ciphertext, a message processing request to a node device accessed to a blockchain and the node device decrypts the message ciphertext in the TEE of the node device and sends the obtained message plaintext to an operator device so that the operator device sends the message to be sent in the message plaintext to the target user.

The service processing apparatus provided by one or more embodiments of the present specification encrypts the message plaintext based on the predetermined mode in the TEE of the service provider device when receiving the service processing request sent by the request user, and sends the obtained message ciphertext to the channel partner device so that the channel partner device sends, based on the message ciphertext, the message processing request to the node device accessed to the blockchain, so the node device decrypts the message ciphertext in its TEE and sends the obtained message plaintext to the operator device so that the operator device sends the message to be sent in the message plaintext to the corresponding target user. Therefore, no user participates in the encryption and decryption of the message based on the characteristics of the TEE, and other applications in the device cannot be accessed, which ensures the authenticity and validity of the message. Meanwhile, the message is sent in the form of a ciphertext to the channel partner device. The channel partner device cannot obtain a decryption algorithm, so it cannot obtain the message plaintext, which means that it cannot store user data, and the privacy and security of the message are ensured. Furthermore, the decryption is performed in the TEE of the node device of the blockchain, so the problem of device-to-device mistrust is solved based on the characteristics of openness and transparency of the blockchain, and it is favorable for scaling up services. Moreover, the service provider device establishes a service channel with the channel partner device, instead of creating an exclusive service channel with the operator device, so the service cost is reduced.

Optionally, the receiving module 401 receives, through a third trusted application related to message processing in the service provider device, the service processing request sent by the request user;

the sending module 403 sends the message ciphertext to a second trusted application in the channel partner device through the third trusted application so that the second trusted application sends, based on the message ciphertext, the message processing request to a first trusted application in the node device accessed to the blockchain, where the second trusted application and the third trusted application are related to message processing.

Optionally, the third trusted application is set in the TEE of the service provider device.

The encryption module 402 encrypts the message plaintext based on the predetermined mode through the third trusted application to obtain the message ciphertext.

Optionally, the third trusted application is set outside the TEE of the service provider device.

The encryption module 402 transmits the message plaintext to the TEE of the service provider device through the third trusted application, and encrypts the message plaintext based on the predetermined mode in the TEE of the service provider device to obtain the message ciphertext.

The sending module 403 obtains the message ciphertext from the TEE of the service provider device through the third trusted application, and sends the obtained message ciphertext to the second trusted application in the channel partner device.

Optionally, the third trusted application includes a trusted side program set in the TEE of the service provider device, and a client program set outside the TEE of the service provider device.

The receiving module 401 receives, through the client program, the service processing request sent by the request user;

the encryption module 402 sends the message plaintext to the trusted side program through the client program, and encrypts the message plaintext based on the predetermined mode through the trusted side program to obtain the message ciphertext; and the sending module 403 obtains the message ciphertext from the trusted side program through the client application, and sends the obtained message ciphertext to the second trusted program in the channel partner device.

Optionally, the sending module 403 selects a target channel partner device from a plurality of predetermined channel partner devices based on the message plaintext and a predetermined scheduling rule, and sends the message ciphertext to the target channel partner device.

Optionally, the sending module 403 generates service processing record information based on the message ciphertext and service identifier information included in the service processing request, and sends the service processing record information to the node device so that the node device stores the service processing record information to the blockchain.

The service processing apparatus provided by one or more embodiments of the present specification encrypts the message plaintext based on the predetermined mode in the TEE of the service provider device when receiving the service processing request sent by the request user, and sends the obtained message ciphertext to the channel partner device so that the channel partner device sends, based on the message ciphertext, the message processing request to the node device accessed to the blockchain, so the node device decrypts the message ciphertext in its TEE and sends the obtained message plaintext to the operator device so that the operator device sends the message to be sent in the message plaintext to the corresponding target user. Therefore, no user participates in the encryption and decryption of the message based on the characteristics of the TEE, and other applications in the device cannot be accessed, which ensures the authenticity and validity of the message. Meanwhile, the message is sent in the form of a ciphertext to the channel partner device. The channel partner device cannot obtain a decryption algorithm, so it cannot obtain the message plaintext, which means that it cannot store user data, and the privacy and security of the message are ensured. Furthermore, the decryption is performed in the TEE of the node device of the blockchain, so the problem of device-to-device mistrust is solved based on the characteristics of openness and transparency of the blockchain, and it is favorable for scaling up services. Moreover, the service provider device establishes a service channel with the channel partner device, instead of creating an exclusive service channel with the operator device, so the service cost is reduced.

It is worthwhile to note that the embodiments of the service processing apparatus in the present specification and the embodiments of the service processing method in the present specification are based on the same inventive idea, so for the specific implementation of the embodiments, reference can be made to the implementation of the previously described corresponding service processing method, and repetitions are omitted.

Figure 18:
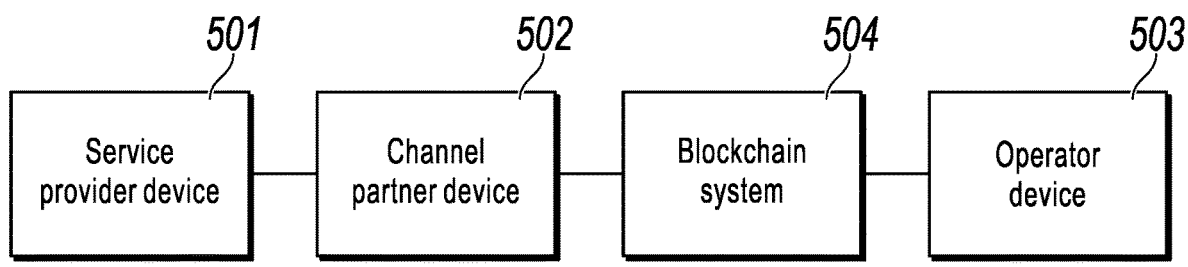
FIG. 18 is a schematic composition diagram illustrating a service processing system, according to one or more embodiments of the present specification.

Further, corresponding to the previously described service processing method, one or more embodiments of the present specification further provide a service processing system based on the same technical idea. FIG. 18 is a schematic diagram illustrating composition of a service processing system, according to one or more embodiments of the present specification. As shown in FIG. 18, the system includes a service provider device 501, a channel partner device 502, an operator device 503 and a blockchain system 504.

The service provider device 501 receives a service processing request sent by a request user, encrypts at least one message plaintext to be processed that is included in the service processing request through a TEE of the service provider device 501 to obtain a message ciphertext, and sends the message ciphertext to the channel partner device 502. The service processing request is used to request to send the message to be sent in the message plaintext to a corresponding target user.

The channel partner device 502 receives the message ciphertext sent by the service provider device 501, and sends the message ciphertext to a node device in the blockchain system 504.

The node device in the blockchain system 504 receives the message ciphertext sent by the channel partner device 502, invokes a first smart contract deployed in the blockchain in the TEE of the node device, decrypts, based on the first smart contract, the message ciphertext to obtain the message plaintext, and sends the message plaintext to the operator device 503.

The operator device 503 receives the message plaintext sent by the node device and sends a message to be sent in the message plaintext to the target user.

In the service processing system provided by one or more embodiments of the present specification, the service provider device encrypts the message plaintext to be processed in its TEE, and sends the obtained message ciphertext to the channel partner device; and the channel partner device sends the received message ciphertext to the node device accessed to the blockchain, decrypts the message ciphertext in the TEE of the node device, and sends the obtained message plaintext to the operator device. Therefore, no user participates in the encryption and decryption of the message based on the characteristics of the TEE, and other applications in the device cannot be accessed, which ensures the authenticity and validity of the message. Meanwhile, the message is sent in the form of a ciphertext to the channel partner device. The channel partner device cannot obtain a decryption algorithm, so it cannot obtain the message plaintext, which means that it cannot store user data, and the privacy and security of the message are ensured. Furthermore, the decryption is performed in the TEE of the node device of the blockchain, so the problem of device-to-device mistrust is solved based on the characteristics of openness and transparency of the blockchain, and it is favorable for scaling up services. Moreover, the service provider device establishes a service channel with the channel partner device, instead of creating an exclusive service channel with the operator device, so the service cost is reduced.

It is worthwhile to note that the embodiments of the service processing system in the present specification and the embodiments of the service processing method in the present specification are based on the same inventive idea, so for the specific implementation of the embodiments, reference can be made to the implementation of the previously described corresponding service processing method, and repetitions are omitted.

Figure 19:
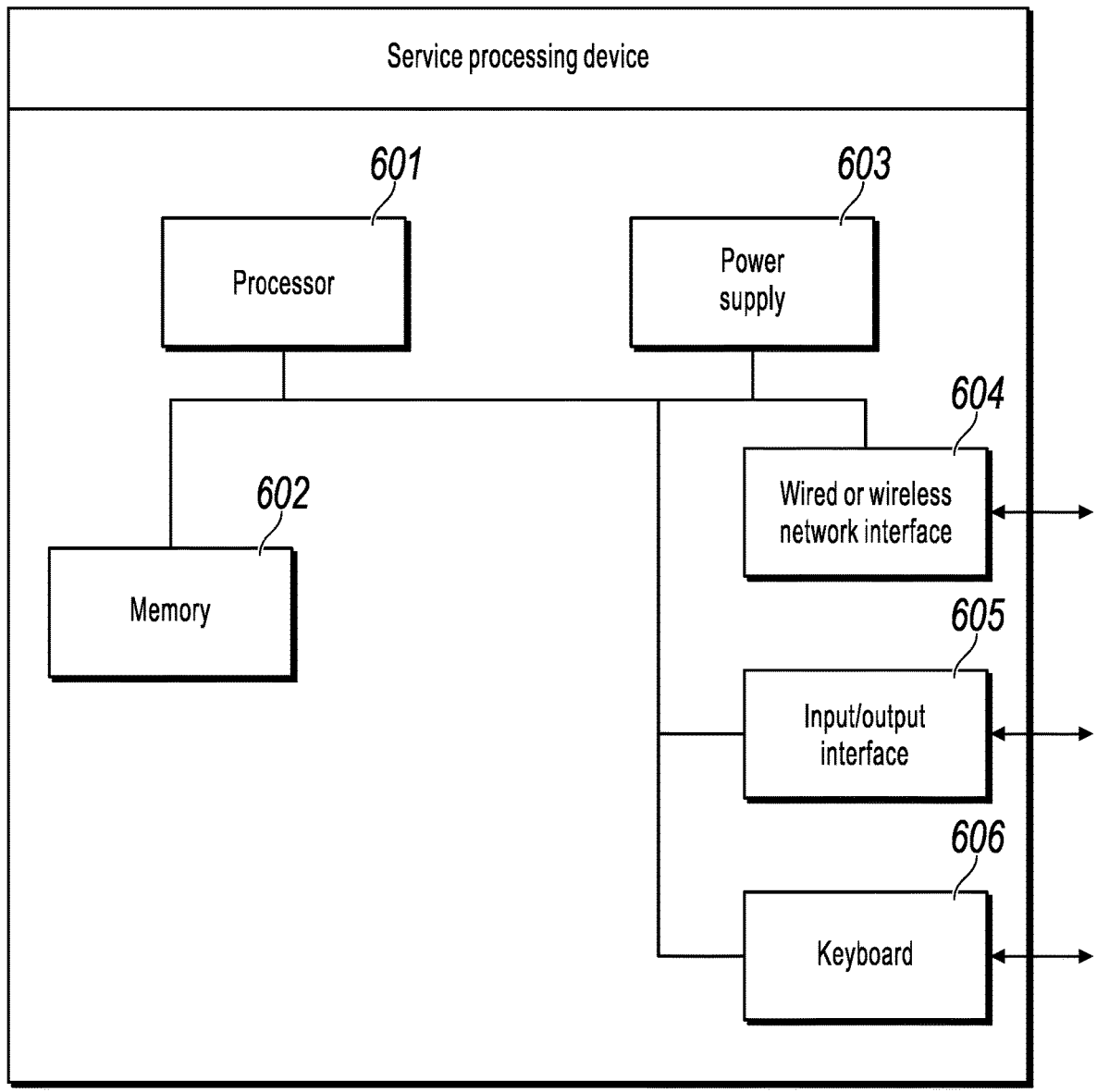
FIG. 19 is a schematic structural diagram illustrating a service processing device, according to one or more embodiments of the present specification.

Further, corresponding to the previously described service processing method, one or more embodiments of the present specification further provide a service processing device based on the same technical idea. The device is configured to implement the previously described service processing method. FIG. 19 is a schematic structural diagram illustrating a service processing device, according to one or more embodiments of the present specification.

As shown in FIG. 19, the service processing device can generate a relatively large difference due to different configurations or performance, and can include one or more processors 601 and memories 602. The memory 602 can store one or more storage applications or data. The memory 602 can be a volatile memory or a non-volatile memory. Applications stored in the memory 602 can include one or more modules (not shown in the figure), and each module can include a series of computer-executable instructions in the service processing device. Further, the processor 601 can be configured to communicate with the memory 602 and execute the series of computer-executable instructions in the memory 602 on the service processing device. The service processing device can further include one or more power supplies 603, one or more wired or wireless network interfaces 604, one or more input/output interfaces 605, one or more keyboards 606, etc.

In one of the specific embodiments, the service processing device includes a memory and one or more programs, where one or more programs are stored in the memory, and one or more programs can include one or more modules; and each module can include a series of computer-executable instructions in the service processing device and is configured to execute, by one or more processors, the one or more programs to execute the following computer-executable instructions:

receiving a message processing request sent by a channel partner device, where the message processing request includes at least one message ciphertext to be processed; the message ciphertext is sent by a service provider device to the channel partner device based on a service processing request sent by a request user after at least one message plaintext to be processed that is included in the service processing request is encrypted through a TEE of the service provider device; the service processing request is used to request to send the message to be sent in the message plaintext to a corresponding target user;

invoking a first smart contract deployed in a blockchain from a TEE of a node device, and decrypting the message ciphertext based on the first smart contract to obtain the message plaintext; and sending the message plaintext to an operator device so that the operator device sends the message to be sent in the message plaintext to the target user.

The service processing device provided by one or more embodiments of the present specification decrypts at least one message ciphertext that is included in the message processing request in the TEE of the node device when receiving the message processing request sent by the channel partner device, and sends the obtained message plaintext to the operator device so that the operator device sends the message to be sent in the message plaintext to the target user, where the message ciphertext is obtained by encrypting, by the service provider device through the TEE of the service provider device based on the service processing request sent by the request user, the at least one message plaintext to be processed that is included in the service processing request. Therefore, no user participates in the encryption and decryption of the message based on the characteristics of the TEE, and other applications in the device cannot be accessed, which ensures the authenticity and validity of the message. Meanwhile, the message is sent in the form of a ciphertext to the channel partner device. The channel partner device cannot obtain a decryption algorithm, so it cannot obtain the message plaintext, which means that it cannot store user data, and the privacy and security of the message are ensured. Furthermore, the decryption is performed in the TEE of the node device of the blockchain, so the problem of device-to-device mistrust is solved based on the characteristics of openness and transparency of the blockchain, and it is favorable for scaling up services. Moreover, the service provider device establishes a service channel with the channel partner device, instead of creating an exclusive service channel with the operator device, so the service cost is reduced.

Optionally, the message processing request further includes identifier information of a service provider corresponding to the service provider device when the computer-executable instructions are executed.

The decrypting the message ciphertext based on the first smart contract to obtain the message plaintext includes:

obtaining associated decryption information from a pre-determined association relationship between the identifier information and the decryption information based on the first smart contract and the identifier information; and decrypting the message ciphertext based on the obtained decryption information to obtain the message plaintext.

Optionally, when the computer-executable instructions are executed, the receiving a message processing request sent by a channel partner device includes:

receiving, through a first trusted application in the node device, the message processing request sent by a second trusted application in the channel partner device, where the first trusted application and the second trusted application are related to message processing.

The sending the message plaintext to an operator device includes:

sending the message plaintext to the operator device through the first trusted application.

Optionally, the first trusted application is set in the TEE of the node device when the computer-executable instructions are executed;

the invoking a first smart contract deployed in a blockchain from a TEE of the node device includes:

invoking the first smart contract deployed in the blockchain through the first trusted application.

Optionally, the first trusted application is set outside the TEE of the node device when the computer-executable instructions are executed;

the invoking a first smart contract deployed in a blockchain from a TEE of the node device includes:

transmitting the message ciphertext to the TEE of the node device through the first trusted application; and invoking the first smart contract deployed in the blockchain from the TEE of the node device.

The sending the message plaintext to the operator device through the first trusted application includes:

obtaining the message plaintext from the TEE of the node device through the first trusted application, and sending the obtained message plaintext to the operator device.

Optionally, when the computer-executable instructions are executed, the first trusted application includes a trusted side program set in the TEE of the node device, and a client program set outside the TEE of the node device.

The receiving, through a first trusted application, the message processing request sent by a second trusted application in the channel partner device in the node device includes:

receiving, through the client program in the node device, the message processing request sent by the second trusted application in the channel partner device.

The invoking a first smart contract deployed in a blockchain from a TEE of the node device includes:

transmitting the message ciphertext to the trusted side program through the client program, and invoking the first smart contract deployed in the blockchain through the trusted side program.

The sending the message plaintext to the operator device through the first trusted application includes:

obtaining the message plaintext from the trusted side program through the client program, and sending the obtained message plaintext to the operator device.

Optionally, when the computer-executable instructions are executed, the sending the message plaintext to an operator device so that the operator device sends the message plaintext to the target user includes:

determining a target operator device corresponding to each message plaintext; and sending the message plaintext to the corresponding target operator device so that the target operator device sends the message to be sent in the message plaintext to the target user.

Optionally, when the computer-executable instructions are executed, the method further includes:

receiving service processing record information sent by the service provider device, and storing the service processing record information to the blockchain, where the service processing record information is generated by the service provider device based on the message ciphertext and service identifier information included in the service processing request; and receiving a service query request sent by a querier device, where the service query request includes service identifier information of a service to be queried;

querying associated service processing record information from the blockchain based on the service identifier information; and sending query result information to the querier device based on the queried service processing record information.

The service processing device provided by one or more embodiments of the present specification decrypts at least one message ciphertext that is included in the message processing request in the TEE of the node device when receiving the message processing request sent by the channel partner device, and sends the obtained message plaintext to the operator device so that the operator device sends the message to be sent in the message plaintext to the target user, where the message ciphertext is obtained by encrypting, by the service provider device through the TEE of the service provider device based on the service processing request sent by the request user, the at least one message plaintext to be processed that is included in the service processing request. Therefore, no user participates in the encryption and decryption of the message based on the characteristics of the TEE, and other applications in the device cannot be accessed, which ensures the authenticity and validity of the message. Meanwhile, the message is sent in the form of a ciphertext to the channel partner device. The channel partner device cannot obtain a decryption algorithm, so it cannot obtain the message plaintext, which means that it cannot store user data, and the privacy and security of the message are ensured. Furthermore, the decryption is performed in the TEE of the node device of the blockchain, so the problem of device-to-device mistrust is solved based on the characteristics of openness and transparency of the blockchain, and it is favorable for scaling up services. Moreover, the service provider device establishes a service channel with the channel partner device, instead of creating an exclusive service channel with the operator device, so the service cost is reduced.

In another one of the specific embodiments, the service processing device includes a memory and one or more programs, where one or more programs are stored in the memory, and one or more programs can include one or more modules; and each module can include a series of computer-executable instructions in the service processing device and is configured to execute, by one or more processors, the one or more programs to execute the following computer-executable instructions:

receiving a service processing request sent by a request user, where the service processing request includes at least one message plaintext to be processed, and the service processing request is used to request to send a message to be sent in the message plaintext to a corresponding target user;

encrypting the message plaintext based on a predetermined mode in a TEE of a service provider device to obtain a message ciphertext; and sending the message ciphertext to a channel partner device so that the channel partner device sends, based on the message ciphertext, a message processing request to a node device accessed to a blockchain and the node device decrypts the message ciphertext in a TEE of the node device and sends the obtained message plaintext to an operator device so that the operator device sends the message to be sent in the message plaintext to the target user.

The service processing device provided by one or more embodiments of the present specification encrypts the message plaintext based on the predetermined mode in the TEE of the service provider device when receiving the service processing request sent by the request user, and sends the obtained message ciphertext to the channel partner device so that the channel partner device sends, based on the message ciphertext, the message processing request to the node device accessed to the blockchain, so the node device decrypts the message ciphertext in its TEE and sends the obtained message plaintext to the operator device so that the operator device sends the message to be sent in the message plaintext to the corresponding target user. Therefore, no user participates in the encryption and decryption of the message based on the characteristics of the TEE, and other applications in the device cannot be accessed, which ensures the authenticity and validity of the message. Meanwhile, the message is sent in the form of a ciphertext to the channel partner device. The channel partner device cannot obtain a decryption algorithm, so it cannot obtain the message plaintext, which means that it cannot store user data, and the privacy and security of the message are ensured. Furthermore, the decryption is performed in the TEE of the node device of the blockchain, so the problem of device-to-device mistrust is solved based on the characteristics of openness and transparency of the blockchain, and it is favorable for scaling up services. Moreover, the service provider device establishes a service channel with the channel partner device, instead of creating an exclusive service channel with the operator device, so the service cost is reduced.

Optionally, when the computer-executable instructions are executed, the receiving a service processing request sent by a request user includes:

receiving, through a third trusted application related to message processing in the service provider device, the service processing request sent by the request user.

The sending the message ciphertext to a channel partner device so that the channel partner device sends, based on the message ciphertext, a message processing request to a node device accessed to a blockchain includes:

sending the message ciphertext to a second trusted application in the channel partner device through the third trusted application so that the second trusted application sends, based on the message ciphertext, the message processing request to a first trusted application in the node device accessed to the blockchain, where the second trusted application and the third trusted application are related to message processing.

Optionally, the third trusted application is set in the TEE of the service provider device when the computer-executable instructions are executed;

the encrypting the message plaintext based on a predetermined mode in a TEE of a service provider device to obtain a message ciphertext includes:

encrypting the message plaintext based on the predetermined mode through the third trusted application to obtain the message ciphertext.

Optionally, the third trusted application is set outside the TEE of the service provider device when the computer-executable instructions are executed;

the encrypting the message plaintext based on a predetermined mode in a TEE of a service provider device to obtain a message ciphertext includes:

transmitting the message plaintext to the TEE of the service provider device through the third trusted application, and encrypting the message plaintext based on the predetermined mode in the TEE of the service provider device to obtain the message ciphertext.

The sending the message ciphertext to a second trusted application in the channel partner device through the third trusted application includes:

obtaining the message ciphertext from the TEE of the service provider device through the third trusted application, and sending the obtained message ciphertext to the second trusted application in the channel partner device.

Optionally, when the computer-executable instructions are executed, the third trusted application includes a trusted side program set in the TEE of the service provider device, and a client program set outside the TEE of the service provider device.

The receiving, through a third trusted application in the service provider device, the service processing request sent by the request user includes:

receiving, through the client program, the service processing request sent by the request user;

the encrypting the message plaintext based on a predetermined mode in a TEE of a service provider device to obtain a message ciphertext includes:

sending the message plaintext to the trusted side program through the client program; and encrypting the message plaintext based on the predetermined mode through the trusted side program to obtain the message ciphertext;

the sending the message ciphertext to a second trusted application in the channel partner device through the third trusted application includes:

obtaining the message ciphertext from the trusted side program through the client program, and sending the obtained message ciphertext to the second trusted application in the channel partner device.

Optionally, when the computer-executable instructions are executed, the sending the message ciphertext to the channel partner device includes:

selecting a target channel partner device from a plurality of predetermined channel partner devices based on the message plaintext and a predetermined scheduling rule; and sending the message ciphertext to the target channel partner device.

Optionally, when the computer-executable instructions are executed, after the message ciphertext is obtained, the method further includes:

generating service processing record information based on the message ciphertext and service identifier information included in the service processing request; and sending the service processing record information to the node device so that the node device stores the service processing record information to the blockchain.

The service processing device provided by one or more embodiments of the present specification encrypts the message plaintext based on the predetermined mode in the TEE of the service provider device when receiving the service processing request sent by the request user, and sends the obtained message ciphertext to the channel partner device so that the channel partner device sends, based on the message ciphertext, the message processing request to the node device accessed to the blockchain, so the node device decrypts the message ciphertext in its TEE and sends the obtained message plaintext to the operator device so that the operator device sends the message to be sent in the message plaintext to the corresponding target user. Therefore, no user participates in the encryption and decryption of the message based on the characteristics of the TEE, and other applications in the device cannot be accessed, which ensures the authenticity and validity of the message. Meanwhile, the message is sent in the form of a ciphertext to the channel partner device. The channel partner device cannot obtain a decryption algorithm, so it cannot obtain the message plaintext, which means that it cannot store user data, and the privacy and security of the message are ensured. Furthermore, the decryption is performed in the TEE of the node device of the blockchain, so the problem of device-to-device mistrust is solved based on the characteristics of openness and transparency of the blockchain, and it is favorable for scaling up services. Moreover, the service provider device establishes a service channel with the channel partner device, instead of creating an exclusive service channel with the operator device, so the service cost is reduced.

It is worthwhile to note that the embodiments of the service processing device in the present specification and the embodiments of the service processing method in the present specification are based on the same inventive idea, so for the specific implementation of the embodiments, reference can be made to the implementation of the previously described corresponding service processing method, and repetitions are omitted.

Further, corresponding to the previously described service processing method, one or more embodiments of the present specification further provide, based on the same technical idea, a storage medium configured to store computer-executable instructions. In one of the specific embodiments, the storage medium can be a USB flash disk, an optical disk, a hard disk, etc. The computer-executable instructions stored in the storage medium, when executed by a processor, can realize the following procedure:

receiving a message processing request sent by a channel partner device, where the message processing request includes at least one message ciphertext to be processed; the message ciphertext is sent by a service provider device to the channel partner device based on a service processing request sent by a request user after at least one message plaintext to be processed that is included in the service processing request is encrypted through a TEE of the service provider device; the service processing request is used to request to send the message to be sent in the message plaintext to a corresponding target user;

invoking a first smart contract deployed in a blockchain from a TEE of a node device, and decrypting the message ciphertext based on the first smart contract to obtain the message plaintext; and sending the message plaintext to an operator device so that the operator device sends the message to be sent in the message plaintext to the target user.

When the computer-executable instructions stored in the storage medium provided by one or more embodiments of the present specification are executed by the processor, at least one message ciphertext that is included in the message processing request in the TEE of the node device is decrypted when receiving the message processing request sent by the channel partner device, and the obtained message plaintext is sent to the operator device so that the operator device sends the message to be sent in the message plaintext to the target user, where the message ciphertext is obtained by encrypting, by the service provider device through the TEE of the service provider device based on the service processing request sent by the request user, the at least one message plaintext to be processed that is included in the service processing request. Therefore, no user participates in the encryption and decryption of the message based on the characteristics of the TEE, and other applications in the device cannot be accessed, which ensures the authenticity and validity of the message. Meanwhile, the message is sent in the form of a ciphertext to the channel partner device. The channel partner device cannot obtain a decryption algorithm, so it cannot obtain the message plaintext, which means that it cannot store user data, and the privacy and security of the message are ensured. Furthermore, the decryption is performed in the TEE of the node device of the blockchain, so the problem of device-to-device mistrust is solved based on the characteristics of openness and transparency of the blockchain, and it is favorable for scaling up services. Moreover, the service provider device establishes a service channel with the channel partner device, instead of creating an exclusive service channel with the operator device, so the service cost is reduced.

Optionally, the message processing request further includes identifier information of a service provider corresponding to the service provider device when the computer-executable instructions stored in the storage medium are executed.

The decrypting the message ciphertext based on the first smart contract to obtain the message plaintext includes:

obtaining associated decryption information from a predetermined association relationship between the identifier information and the decryption information based on the first smart contract and the identifier information; and decrypting the message ciphertext based on the obtained decryption information to obtain the message plaintext.

Optionally, when the computer-executable instructions stored in the storage medium are executed by the processor, the receiving a message processing request sent by a channel partner device includes:

receiving, through a first trusted application in the node device, the message processing request sent by a second trusted application in the channel partner device, where the first trusted application and the second trusted application are related to message processing.

The sending the message plaintext to an operator device includes:

sending the message plaintext to the operator device through the first trusted application.

Optionally, the first trusted application is set in the TEE of the node device when the computer-executable instructions stored in the storage medium are executed by the processor;

the invoking a first smart contract deployed in a blockchain from a TEE of a node device includes:

invoking the first smart contract deployed in the blockchain through the first trusted application.

Optionally, the first trusted application is set outside the TEE of the node device when the computer-executable instructions stored in the storage medium are executed;

the invoking a first smart contract deployed in a blockchain from a TEE of a node device includes:

transmitting the message ciphertext to the TEE of the node device through the first trusted application; and invoking the first smart contract deployed in the blockchain from the TEE of the node device.

The sending the message plaintext to the operator device through the first trusted application includes:

obtaining the message plaintext from the TEE of the node device through the first trusted application, and sending the obtained message plaintext to the operator device.

Optionally, when the computer-executable instructions stored in the storage medium are executed by the processor, the first trusted application includes a trusted side program set in the TEE of the node device, and a client program set outside the TEE of the node device.

The receiving, through a first trusted application in the node device, the message processing request sent by a second trusted application in the channel partner device includes:

receiving, through the client program in the node device, the message processing request sent by the second trusted application in the channel partner device.

The invoking a first smart contract deployed in a blockchain from a TEE of a node device includes:

transmitting the message ciphertext to the trusted side program through the client program, and invoking the first smart contract deployed in the blockchain through the trusted side program.

The sending the message plaintext to the operator device through the first trusted application includes:

obtaining the message plaintext from the trusted side program through the client program, and sending the obtained message plaintext to the operator device.

Optionally, when the computer-executable instructions stored in the storage medium are executed by the processor, the sending the message plaintext to an operator device so that the operator device sends the message plaintext to the target user includes:

determining a target operator device corresponding to each message plaintext; and sending the message plaintext to the corresponding target operator device so that the target operator device sends the message to be sent in the message plaintext to the target user.

Optionally, when the computer-executable instructions stored in the storage medium are executed by the processor, the method further includes:

receiving service processing record information sent by the service provider device, and storing the service processing record information to the blockchain, where the service processing record information is generated by the service provider device based on the message ciphertext and service identifier information included in the service processing request; and receiving a service query request sent by a querier device, where the service query request includes service identifier information of a service to be queried;

querying associated service processing record information from the blockchain based on the service identifier information; and sending query result information to the querier device based on the queried service processing record information.

When the computer-executable instructions stored in the storage medium provided by one or more embodiments of the present specification are executed by the processor, at least one message ciphertext that is included in the message processing request in the TEE of the node device is decrypted when receiving the message processing request sent by the channel partner device, and the obtained message plaintext is sent to the operator device so that the operator device sends the message to be sent in the message plaintext to the target user, where the message ciphertext is obtained by encrypting, by the service provider device through the TEE of the service provider device based on the service processing request sent by the request user, the at least one message plaintext to be processed that is included in the service processing request. Therefore, no user participates in the encryption and decryption of the message based on the characteristics of the TEE, and other applications in the device cannot be accessed, which ensures the authenticity and validity of the message. Meanwhile, the message is sent in the form of a ciphertext to the channel partner device. The channel partner device cannot obtain a decryption algorithm, so it cannot obtain the message plaintext, which means that it cannot store user data, and the privacy and security of the message are ensured. Furthermore, the decryption is performed in the TEE of the node device of the blockchain, so the problem of device-to-device mistrust is solved based on the characteristics of openness and transparency of the blockchain, and it is favorable for scaling up services. Moreover, the service provider device establishes a service channel with the channel partner device, instead of creating an exclusive service channel with the operator device, so the service cost is reduced.

In one of the specific embodiments, the storage medium can be a USB flash disk, an optical disk, a hard disk, etc. The computer-executable instructions stored in the storage medium, when executed by a processor, can realize the following procedure:

receiving a service processing request sent by a request user, where the service processing request includes at least one message plaintext to be processed, and the service processing request is used to request to send a message to be sent in the message plaintext to a corresponding target user;

encrypting the message plaintext based on a predetermined mode in a TEE of a service provider device to obtain a message ciphertext;

sending the message ciphertext to a channel partner device so that the channel partner device sends, based on the message ciphertext, a message processing request to a node device accessed to a blockchain and the node device decrypts the message ciphertext in a TEE of the node device and sends the obtained message plaintext to an operator device so that the operator device sends the message to be sent in the message plaintext to the target user.

When the computer-executable instructions stored in the storage medium provided by one or more embodiments of the present specification are executed by the processor, the message plaintext is encrypted based on the predetermined mode in the TEE of the service provider device when receiving the service processing request sent by the request user, and the obtained message ciphertext is sent to the channel partner device so that the channel partner device sends, based on the message ciphertext, the message processing request to the node device accessed to the blockchain, so the node device decrypts the message ciphertext in its TEE and sends the obtained message plaintext to the operator device so that the operator device sends the message to be sent in the message plaintext to the corresponding target user. Therefore, no user participates in the encryption and decryption of the message based on the characteristics of the TEE, and other applications in the device cannot be accessed, which ensures the authenticity and validity of the message. Meanwhile, the message is sent in the form of a ciphertext to the channel partner device. The channel partner device cannot obtain a decryption algorithm, so it cannot obtain the message plaintext, which means that it cannot store user data, and the privacy and security of the message are ensured. Furthermore, the decryption is performed in the TEE of the node device of the blockchain, so the problem of device-to-device mistrust is solved based on the characteristics of openness and transparency of the blockchain, and it is favorable for scaling up services. Moreover, the service provider device establishes a service channel with the channel partner device, instead of creating an exclusive service channel with the operator device, so the service cost is reduced.

Optionally, when the computer-executable instructions stored in the storage medium are executed by the processor, the receiving a service processing request sent by a request user includes:

receiving, through a third trusted application related to message processing in the service provider device, the service processing request sent by the request user.

The sending the message ciphertext to a channel partner device so that the channel partner device sends, based on the message ciphertext, a message processing request to a node device accessed to a blockchain includes:

sending the message ciphertext to a second trusted application in the channel partner device through the third trusted application so that the second trusted application sends, based on the message ciphertext, the message processing request to a first trusted application in the node device accessed to the blockchain, where the second trusted application and the third trusted application are related to message processing.

Optionally, the third trusted application is set in the TEE of the service provider device when the computer-executable instructions stored in the storage medium are executed by the processor;

the encrypting the message plaintext based on a predetermined mode in a TEE of a service provider device to obtain a message ciphertext includes:

encrypting the message plaintext based on the predetermined mode through the third trusted application to obtain the message ciphertext.

Optionally, the third trusted application is set outside the TEE of the service provider device when the computer-executable instructions stored in the storage medium are executed by the processor;

the encrypting the message plaintext based on a predetermined mode in a TEE of a service provider device to obtain a message ciphertext includes:

transmitting the message plaintext to the TEE of the service provider device through the third trusted application, and encrypting the message plaintext based on the predetermined mode in the TEE of the service provider device to obtain the message ciphertext;

the sending the message ciphertext to a second trusted application in the channel partner device through the third trusted application includes:

obtaining the message ciphertext from the TEE of the service provider device through the third trusted application, and sending the obtained message ciphertext to the second trusted application in the channel partner device.

Optionally, when the computer-executable instructions stored in the storage medium are executed by the processor, the third trusted application includes a trusted side program set in the TEE of the node device, and a client program set outside the TEE of the node device.

The receiving, through the third trusted application in the service provider device, the service processing request sent by the request user includes:

receiving, through the client program, the service processing request sent by the request user;

the encrypting the message plaintext based on a predetermined mode in a TEE of a service provider device to obtain a message ciphertext includes:

sending the message plaintext to the trusted side program through the client program; and encrypting the message plaintext based on the predetermined mode through the trusted side program to obtain the message ciphertext;

the sending the message ciphertext to a second trusted application in the channel partner device through the third trusted application includes:

obtaining the message ciphertext from the trusted side program through the client program, and sending the obtained message ciphertext to the second trusted application in the channel partner device.

Optionally, when the computer-executable instructions stored in the storage medium are executed by the processor, the sending the message ciphertext to the channel partner device includes:

selecting a target channel partner device from a plurality of predetermined channel partner devices based on the message plaintext and a predetermined scheduling rule; and sending the message ciphertext to the target channel partner device.

Optionally, when the computer-executable instructions stored in the storage medium are executed by the processor, the method further includes the following after the message ciphertext is obtained:

generating service processing record information based on the message ciphertext and service identifier information included in the service processing request; and sending the service processing record information to the node device so that the node device stores the service processing record information to the blockchain.

When the computer-executable instructions stored in the storage medium provided by one or more embodiments of the present specification are executed by the processor, the message plaintext is encrypted based on the predetermined mode in the TEE of the service provider device when receiving the service processing request sent by the request user, and the obtained message ciphertext is sent to the channel partner device so that the channel partner device sends, based on the message ciphertext, the message processing request to the node device accessed to the blockchain, so the node device decrypts the message ciphertext in its TEE and sends the obtained message plaintext to the operator device so that the operator device sends the message to be sent in the message plaintext to the corresponding target user. Therefore, no user participates in the encryption and decryption of the message based on the characteristics of the TEE, and other applications in the device cannot be accessed, which ensures the authenticity and validity of the message. Meanwhile, the message is sent in the form of a ciphertext to the channel partner device. The channel partner device cannot obtain a decryption algorithm, so it cannot obtain the message plaintext, which means that it cannot store user data, and the privacy and security of the message are ensured. Furthermore, the decryption is performed in the TEE of the node device of the blockchain, so the problem of device-to-device mistrust is solved based on the characteristics of openness and transparency of the blockchain, and it is favorable for scaling up services. Moreover, the service provider device establishes a service channel with the channel partner device, instead of creating an exclusive service channel with the operator device, so the service cost is reduced.

It is worthwhile to note that the embodiments of the storage medium in the present specification and the embodiments of the service processing method in the present specification are based on the same inventive idea, so for the specific implementation of the embodiments, reference can be made to the implementation of the previously described corresponding service processing method, and repetitions are omitted.

Specific embodiments of the present specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing is feasible or may be advantageous.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, the programming is mostly implemented by modifying "logic compiler" software instead of manually making an integrated circuit chip. This is similar to a software compiler used for program development and compiling. However, original code before compiling is also written in a specific programming language, which is referred to as a hardware description language (HDL). There are many HDLs, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL). Currently, a Very-High-Speed Integrated Circuit Hardware Description Language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented in any appropriate manner. For example, the controller can be a microprocessor, a processor, or a computer readable medium, a logic gate, a switch, an application-specific integrated circuit (ASIC), a programmable logic controller, or an embedded microcontroller that stores computer readable program code (for example, software or firmware) that can be executed by the processor (or the microprocessor). Examples of the controller include but are not limited to the following microcontrollers: ARC 625D, Atmel AT91SAM, Microchip PIC18F26K20, or Silicon Labs C8051F320. A memory controller can also be implemented as a part of control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, device, module, or unit illustrated in the previous embodiments can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the embodiments of the present specification are implemented, a function of each unit can be implemented in one or more pieces of software and/or hardware.

A person skilled in the art should understand that one or more embodiments of the present application can be provided as a method, a system, or a computer program product. Therefore, the one or more embodiments of the present specification can use a form of hardware only embodiments, software only embodiments, or embodiments with a combination of software and hardware. Moreover, the present specification can use a form of a computer program product that is implemented on one or more computer-usable storage media (including but not limited to a disk memory, a CD-ROM, an optical memory, etc.) that include computer-usable program code.

The present specification is described with reference to the flowcharts and/or block diagrams of the method, the device (system), and the computer program product based on the embodiments of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a specific-purpose computer, an embedded processor, or a processor of another programmable data processing device to generate a machine, so the instructions executed by the computer or the processor of other programmable data processing devices generate a device for implementing a specific function in one or more processes in the flowcharts and/or in one or more blocks in the block diagrams.

These computer program instructions can be stored in a computer readable memory that can instruct the computer or other programmable data processing devices to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and steps are performed on the computer or other programmable devices, thereby generating computer-implemented processing. Therefore, the instructions executed on the computer or other programmable devices provide steps for implementing a specific function in one or more processes in the flowcharts and/or in one or more blocks in the block diagrams.

In a typical configuration, a computing device includes one or more processors (CPU), an input/output interface, a network interface, and a memory.

The memory may include a non-persistent memory, a random access memory (RAM), and/or a non-volatile memory in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present application, the computer readable medium does not include computer readable transitory media such as a modulated data signal and a carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

The one or more embodiments of the present specification can be described in common contexts of computer executable instructions executed by a computer, such as a program module. Generally, the program module includes a routine, a program, an object, a component, a data structure, etc. executing a specific task or implementing a specific abstract data type. The one or more embodiments of the present specification can also be practiced in distributed computing environments. In the distributed computing environments, tasks are performed by remote processing devices that are connected through a communications network. In a distributed computing environment, the program module can be located in both local and remote computer storage media including storage devices.

The embodiments in the present specification are described in a progressive way. For same or similar parts of the embodiments, references can be made to the embodiments. Each embodiment focuses on a difference from other embodiments. Particularly, a system embodiment is similar to a method embodiment, and therefore is described briefly. For related parts, references can be made to related descriptions in the method embodiment.

The previous description is merely embodiments of the present specification, and is not intended to limit the present specification. A person skilled in the art can make various modifications and changes to the present specification. Any modification, equivalent replacement, or improvement made without departing from the spirit and principle of the present specification shall fall within the scope of the claims of the present specification.

What is claimed is:

1. A computer-implemented method comprising:
receiving, by a client program comprised in a first trusted application in a blockchain node of a blockchain network, a message processing request from a second trusted application in a channel partner device, wherein the message processing request comprises a ciphertext message encrypted in a trusted execution environment (TEE) of a service provider device based on a service processing request that comprises a plaintext message of the ciphertext message, and wherein the service processing request requests at least a portion of the plaintext message to be sent to a target user, wherein the client program is installed outside a TEE of the blockchain node;
transmitting, by the client program, the ciphertext message to a trusted side program installed in the TEE of the blockchain node;
invoking, by the trusted side program, a first smart contract deployed in a blockchain of the blockchain network;
decrypting the ciphertext message based on the first smart contract to obtain the plaintext message;
obtaining, by the client program, the plaintext message from the trusted side program; and
sending, using the first trusted application, the plaintext message to an operator device to forward the at least a portion of the plaintext message to the target user.

2. The computer-implemented method of claim 1, wherein the message processing request further comprises an identifier of a service provider corresponding to the service provider device, and wherein decrypting the ciphertext message comprises:
obtaining, based on the first smart contract and the identifier, decryption information from a predetermined relationship between the identifier and the decryption information; and
decrypting the ciphertext message based on the decryption information to obtain the plaintext message.

3. The computer-implemented method of claim 1, wherein the first trusted application is installed in the TEE of the blockchain node and wherein invoking the first smart contract comprises invoking the first smart contract using the first trusted application.

4. The computer-implemented method of claim 1, wherein the first trusted application is installed outside the TEE of the blockchain node, wherein invoking the first smart contract comprises transmitting the ciphertext message to the TEE of the blockchain node using the first trusted application, and wherein sending the plaintext message to the operator device comprises:
  obtaining the plaintext message from the TEE of the blockchain node using the first trusted application; and
  sending the plaintext message to the operator device.

5. The computer-implemented method of claim 1, wherein the first trusted application comprises the trusted side program and the client program.

6. The computer-implemented method of claim 1, further comprising:
  receiving service processing record information from the service provider device;
  storing the service processing record information on the blockchain, wherein the service processing record information is generated by the service provider device based on the ciphertext message and service identifier information comprised in the service processing request;
  receiving a service query request from a querier device, wherein the service query request comprises the service identifier information;
  querying the service processing record information on the blockchain associated with the service identifier information to obtain query result; and
  sending the query result to the querier device.

7. A non-transitory, computer-readable medium storing one or more instructions executable by a computer system to perform operations comprising:
  receiving, by a client program comprised in a first trusted application in a blockchain node of a blockchain network, a message processing request from a second trusted application in a channel partner device, wherein the message processing request comprises a ciphertext message encrypted in a trusted execution environment (TEE) of a service provider device based on a service processing request that comprises a plaintext message of the ciphertext message, and wherein the service processing request requests at least a portion of the plaintext message to be sent to a target user, wherein the client program is installed outside a TEE of the blockchain node;
  transmitting, by the client program, the ciphertext message to a trusted side program installed in the TEE of the blockchain node;
  invoking, by the trusted side program, a first smart contract deployed in a blockchain of the blockchain network;
  decrypting the ciphertext message based on the first smart contract to obtain the plaintext message;
  obtaining, by the client program, the plaintext message from the trusted side program; and
  sending, using the first trusted application, the plaintext message to an operator device to forward the at least a portion of the plaintext message to the target user.

8. The non-transitory, computer-readable medium of claim 7, wherein the message processing request further comprises an identifier of a service provider corresponding to the service provider device, and wherein decrypting the ciphertext message comprises:

obtaining, based on the first smart contract and the identifier, decryption information from a predetermined relationship between the identifier and the decryption information; and
  decrypting the ciphertext message based on the decryption information to obtain the plaintext message.

9. The non-transitory, computer-readable medium of claim 7, wherein the first trusted application is installed in the TEE of the blockchain node and wherein invoking the first smart contract comprises invoking the first smart contract using the first trusted application.

10. The non-transitory, computer-readable medium of claim 7, wherein the first trusted application is installed outside the TEE of the blockchain node, wherein invoking the first smart contract comprises transmitting the ciphertext message to the TEE of the blockchain node using the first trusted application, and wherein sending the plaintext message to the operator device comprises:
  obtaining the plaintext message from the TEE of the blockchain node using the first trusted application; and
  sending the plaintext message to the operator device.

11. The non-transitory, computer-readable medium of claim 7, wherein the first trusted application comprises the trusted side program and the client program.

12. The non-transitory, computer-readable medium of claim 7, the operations further comprising:
  receiving service processing record information from the service provider device;
  storing the service processing record information on the blockchain, wherein the service processing record information is generated by the service provider device based on the ciphertext message and service identifier information comprised in the service processing request;
  receiving a service query request from a querier device, wherein the service query request comprises the service identifier information;
  querying the service processing record information on the blockchain associated with the service identifier information to obtain query result; and
  sending the query result to the querier device.

13. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations comprising:
    receiving, by a client program comprised in a first trusted application in a blockchain node of a blockchain network, a message processing request from a second trusted application in a channel partner device, wherein the message processing request comprises a ciphertext message encrypted in a trusted execution environment (TEE) of a service provider device based on a service processing request that comprises a plaintext message of the ciphertext message, and wherein the service processing request requests at least a portion of the plaintext message to be sent to a target user, wherein the client program is installed outside a TEE of the blockchain node;
    transmitting, by the client program, the ciphertext message to a trusted side program installed in the TEE of the blockchain node;

invoking, by the trusted side program, a first smart contract deployed in a blockchain of the blockchain network;

decrypting the ciphertext message based on the first smart contract to obtain the plaintext message;

obtaining, by the client program, the plaintext message from the trusted side program; and sending, using the first trusted application, the plaintext message to an operator device to forward the at least a portion of the plaintext message to the target user.

14. The computer-implemented system of claim 13, wherein the message processing request further comprises an identifier of a service provider corresponding to the service provider device, and wherein decrypting the ciphertext message comprises:

obtaining, based on the first smart contract and the identifier, decryption information from a predetermined relationship between the identifier and the decryption information; and decrypting the ciphertext message based on the decryption information to obtain the plaintext message.

15. The computer-implemented system of claim 13, wherein the first trusted application is installed in the TEE of the blockchain node and wherein invoking the first smart contract comprises invoking the first smart contract using the first trusted application.

16. The computer-implemented system of claim 13, wherein the first trusted application is installed outside the TEE of the blockchain node, wherein invoking the first smart contract comprises transmitting the ciphertext message to the TEE of the blockchain node using the first trusted application, and wherein sending the plaintext message to the operator device comprises:

obtaining the plaintext message from the TEE of the blockchain node using the first trusted application; and sending the plaintext message to the operator device.

17. The computer-implemented system of claim 13, wherein the first trusted application comprises the trusted side program and the client program.

* * * * *